United States Patent
Novak et al.

(10) Patent No.: US 11,144,501 B2
(45) Date of Patent: Oct. 12, 2021

(54) LOCATING FILES USING A DURABLE AND UNIVERSAL FILE IDENTIFIER

(71) Applicant: MICROSOFT TECHNOLOGY LICENSING, LLC, Redmond, WA (US)

(72) Inventors: Michael John Novak, Redmond, WA (US); Raju Jain, Kirkland, WA (US); John Heinrich Lueders, Seattle, WA (US); Robert Paul St. Pierre, Redmond, WA (US); Calvin Tonini, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 401 days.

(21) Appl. No.: 15/919,015

(22) Filed: Mar. 12, 2018

(65) Prior Publication Data
US 2019/0278851 A1 Sep. 12, 2019

(51) Int. Cl.
G06F 16/14 (2019.01)
G06F 9/54 (2006.01)
G06F 16/13 (2019.01)
G06F 16/178 (2019.01)
G06F 16/951 (2019.01)
G06F 16/955 (2019.01)

(52) U.S. Cl.
CPC ............ *G06F 16/148* (2019.01); *G06F 9/547* (2013.01); *G06F 16/13* (2019.01); *G06F 16/178* (2019.01); *G06F 16/951* (2019.01); *G06F 16/955* (2019.01)

(58) Field of Classification Search
USPC ....................................................... 707/769
See application file for complete search history.

(56) References Cited

U.S. PATENT DOCUMENTS

| | | | |
|---|---|---|---|
| 7,010,568 B1 * | 3/2006 | Schneider | G06F 16/9566 707/999.01 |
| 8,332,357 B1 | 12/2012 | Chung | |
| 10,162,806 B1 * | 12/2018 | Kirkpatrick | G06F 17/00 |
| 2001/0047400 A1 * | 11/2001 | Coates et al. | G06F 17/30 707/E17.01 |
| 2003/0009392 A1 * | 1/2003 | Perkowski | G06Q 30/0641 705/14.51 |

(Continued)

OTHER PUBLICATIONS

Haslhofer, et al., "DSNotify—Detecting and Fixing Broken Links in Linked Data Sets", In Proceedings of the 20th International Workshop on Database and Expert Systems Application, Aug. 31, 2009, 5 Pages.

(Continued)

*Primary Examiner* — Muluemebet Gurmu

(57) ABSTRACT

Files can be located using a durable and universal file identifier. A content URI includes a file protocol URI specifying a path to a file. The file protocol URI includes a query string specifying properties of the file that can be utilized to locate the file, such as an object ID property specifying a GUID for the file and a volume ID property specifying a GUID for a storage volume storing the file. The content URI can be utilized to locate the file using the file protocol URI and its associated query string even if the file has been moved, renamed, or is accessed on a different computing device. Operations can then be performed using the file, such as resuming a previously performed activity that used the file.

18 Claims, 12 Drawing Sheets

(56) References Cited

U.S. PATENT DOCUMENTS

2009/0089337 A1 4/2009 Perlin et al.
2012/0030039 A1* 2/2012 Fernandez Gutierrez ...................
G06Q 30/0277
705/14.73
2012/0331108 A1* 12/2012 Ferdowsi ................ H04L 67/06
709/219

OTHER PUBLICATIONS

"International Search Report and Written Opinion Issued in PCT Application No. PCT/US2019/020459", dated Apr. 5, 2019, 12 Pages.

* cited by examiner

CREATE ACTIVITY DATA STRUCTURE INCLUDING A CONTENT URI FOR A FILE IN A SYNCHRONIZED LOCATION

LOCATING FILES USING A DURABLE AND UNIVERSAL FILE IDENTIFIER

BACKGROUND

Modern computing devices enable users to perform a seemingly endless variety of activities. As a result, users of such computing devices commonly engage in many different types of activities on a daily basis, such as performing productivity activities like creating documents in word processing applications, engaging in creative activities like editing photos, and enjoying entertainment activities like watching streaming movies.

Due to the large number of activities computing users engage in, it can be difficult for users to later resume those activities, particularly when the activities were performed a long time in the past. As a result, users commonly perform searches to locate files related to previously-performed activities to resume those activities. For example, a user might search for a word processing file that they previously edited to resume editing of the file. Searching for files relating to previously-performed activities in this manner can, however, utilize significant computing resources, such as processor cycles and memory.

In order to address the problem described above, some computing devices provide mechanisms for allowing users to quickly access previously-used files. For example, some computing devices provide a recently-used file list that identifies some of the files recently accessed by a user. When a file identified in a recently-used file list is selected, the application associated with the file is executed and the file is opened. Some mechanisms for accessing previously-used files, like recently-used file lists, include entries corresponding to files accessed on multiple devices associated with the same user.

Mechanisms for accessing recently used files do not, however, work in many scenarios. For example, it might not be possible to identify the location of a file identified in a recently-used file list if the file has been renamed or moved since it was last accessed. This problem can be exacerbated in scenarios where a recently-used file list identifies files that have been accessed on multiple user devices. For example, if a user selects a file in a recently-used file list that was accessed on another of their computing devices, it might not be possible to locate the file if it is stored in a different location on each device. This might occur, for instance, if the file is synchronized between the devices, but stored in a different location on each device, or if the file is on removable media that is assigned a different driver letter on each device.

Because mechanisms for accessing previously-used files do not work in many scenarios, users often resort to searching for previously-used files to resume previous activities. This can include, for example, performing a text search for a file used previously, or browsing for the file using a graphical user interface ("GUI"). In either case, and as mentioned above, searching or browsing for files related to previous activities in this manner can utilize significant computing resources, such as processor cycles and memory. This can also be extremely frustrating for computer users.

In a related scenario, a user might receive a traditional hyperlink from another user. The file referenced by the hyperlink might, however, be renamed or moved after the creation of the hyperlink. The hyperlink, therefore, will not be usable for accessing the referenced file. This can also be frustrating for users and cause them to search for the referenced file in the ways described above, thereby unnecessarily utilizing computing resources, such as processor, memory, and network bandwidth.

It is with respect to these and other technical challenges that the disclosure made herein is presented.

SUMMARY

Technologies are described herein for locating files using a durable and universal file identifier. Through an implementation of the technologies disclosed herein, users can quickly locate files, even if the files have been moved or renamed. This mechanism can reduce or eliminate the need for users to search or browse for files in scenarios such as those described above and, as a result, can improve the performance of computing devices implementing the disclosed technologies by reducing the use of computing resources, such as processor cycles and memory. Other technical benefits not specifically mentioned herein can also be realized through implementations of the disclosed subject matter.

In order to realize the technical benefits mentioned briefly above, a computing device is provided that is configured to generate a content uniform resource identifier ("URI"). The content URI includes data that can be utilized to locate a file even if the file has been renamed or moved. In particular, the content URI includes a file protocol URI specifying a path to a file on a computing system. The content URI can alternately specify a URI provided by a synchronization service that identifies the file at the synchronization service. The content URI also includes a query string including parameters that can be utilized to locate the file if the file has been moved or renamed.

In one embodiment, the query string for the file protocol URI includes an object identifier ("ID") property specifying a globally unique identifier ("GUID") or other type of unique identifier for the file referenced by the file protocol URI. The GUID might, for example, be assigned and maintained by an operating system. Other types of identifiers that uniquely identify a file can be used in other embodiments.

The query string of the content URI also includes a "known folder" property in some embodiments. The known folder property indicates if the file referenced by the file protocol URI is stored in a known folder. A known folder represents a symbolic link to a well-known location that may be located in distinct locations across operating system installations. In an installation of the MICROSOFT WINDOWS operating system, for example, known folders might include the desktop, documents, downloads, and pictures folders. Other operating systems might utilize other known folders.

The query string of the file protocol URI can also specify a volume ID property specifying a GUID or other type of unique identifier for a storage volume storing the file referenced by the file protocol URI. The GUID defined by the volume ID property might also be assigned and maintained by an operating system. It is to be appreciated that the parameters of the query string described above are merely illustrative and that the query string of the content URI can include other parameters that can be utilized to locate a file in other embodiments. For example, and without limitation, the parameters can include one or more other properties of a file, one or more properties associated with a file by a file system, or secondary metadata for the file obtained from another source.

The content URI disclosed herein can be transmitted between computers and used similarly to a hyperlink to locate and access files. As discussed above, however, the disclosed content URI and associated computing systems provide additional functionality not possible with a traditional hyperlink, namely to enable files to be located even when the files have been moved or renamed.

In one particular embodiment, for example, a content URI can be used to locate and access files at a computing device (which might be referred to herein as a "second computing device") that was utilized during an activity previously performed on another user computing device (which might be referred to herein as a "first computing device"), even if the files have been moved or renamed. In order to enable this functionality, an activity data structure is created in some embodiments that can be utilized to resume a previously performed file-based activity. The activity data structure includes a content URI, such as that described above, and an activation URI.

The activation URI identifies an application that was used to perform an activity on a file (e.g. a word processing application used to edit a file) and can be utilized to activate the application associated with the file to resume the activity. As discussed above, the content URI includes a file protocol URI specifying a path to a file on a computing system and a query string that includes parameters that can be utilized to locate the file, even if the file has been moved or renamed. The content URI can be included in the activation URI as a query string parameter.

In this embodiment, an application, activity monitor, operating system component, or another component creates an activity data structure for an activity (e.g. editing a file in a word processing application) at or around the time the activity is performed. For example, and without limitation, an application programming interface ("API") for creating a content URI for a file is provided in one embodiment. The API can receive a request to create a content URI, such as from the application used to perform an activity. The request can specify a path to the file on a storage volume upon which the file is located.

In response to receiving such a request, the API locates properties associated with the file that can be utilized to locate the file if it is renamed or moved. For example, the API can locate an object ID property for the file that includes a GUID or other type of unique identifier for the file. The API can also locate a volume ID property specifying a GUID or other type of unique identifier for the storage volume upon which the file is stored. In some embodiments, the API can also determine if the file is stored in a known folder. The API can locate other properties that can be used to locate the file in other embodiments.

In scenarios where a file is stored in a location that is synchronized by a file synchronization service (e.g. the ONEDRIVE or DROPBOX synchronization services), the API can provide the local file path to the synchronization service. In response thereto, the synchronization service can locate its internal path to the file, such as a fully qualified HTTP URI to the file on the synchronization service and provide the path to the API. The synchronization service might also provide its unique identifier for the file. The API then stores the internal path and ID used by the synchronization service in the content URI. As will be described in greater detail below, the path and ID for the file used by the synchronization service can later be used to obtain the local path of the file on a computing device from the synchronization service.

Once the API has obtained at least some the properties described above, the API can create the content URI for the file. As discussed above, the content URI includes the file protocol URI or a synchronization service path to the file. As also discussed above, the file protocol URI includes a query string that can include the object ID property, the volume ID property, or a known folder property. The query string can include alternate or additional properties of a file that can be utilized to locate the file even if it has been renamed or moved in other embodiments. It is to be appreciated that while an API is used in some embodiments to create the content URI, other components, such as an application, can create the content URI in other embodiments.

Once the content URI has been created, the API can then return the content URI in response to the request received at the API. For example, the API might return the content URI to the application used to perform the activity. As will be discussed in detail below, the content URI can then be used to locate the file at a computing device (e.g. if the file has moved or been renamed). An activity that utilized the file can then be resumed in some embodiments.

Once an activity data structure has been created, portions of the activity data structure are then exposed to users through a UI in some embodiments. For example, a UI can be presented that includes UI controls generated from activity data structures, such as thumbnail images and/or text, that correspond to activities previously engaged in by a user. The UI controls can, for instance, identify the application and the file used during an activity. UI controls for activities performed on each of a user's computing devices can also be presented by synchronizing the activity data structures describing the user's activities between devices.

Selection of one of the UI controls (e.g. a thumbnail image) in the UI by a user will resume the previous activity using the associated activity data structure. For example, a word processing application might be executed and provided with a file that was edited during the activity. As another example, a web browser application might be executed, and a web page previously visited by a user might be loaded. Other types of UIs for resuming previously performed activities can be utilized in other embodiments.

In order to identify a file associated with an activity, an operating system provides an API in some embodiments. In these embodiments, an application or another component can provide a request to the API for the location of a file associated with a previous activity. The request can include the content URI for the file.

When the API receives such a request, it can utilize the content URI to locate the file, even if the file has been renamed, moved or synchronized to a computing device other than the device upon which the activity was performed. For example, the API can utilize the file protocol URI contained in the content URI to determine if the file is accessible at its original path (i.e. the path specified by the file protocol URI). This can be used, for example, to locate a file on a computing device that is in the same location as it was when the content URI was created. In this manner, the file protocol URI can be utilized to locate the file without reference to the properties set forth in the query string of the file protocol URI.

The API can also use the GUID or other type of unique identifier stored in the volume ID property of the content URI to determine if a file is located on a storage volume that was originally accessible at a first computing device, but which is later accessed at a second computing device. For instance, a removable storage device might store a file that is accessed on one computing device and then later accessed on another computing device. The removable storage device might, however, be assigned a different drive letter on the second computing device and, therefore, the path of the file will change. In order to locate a file in this scenario, the API determines whether a storage volume is available that has a GUID matching the GUID in the content URI and, if so, searches the storage volume for the file. The API can also utilize the known folder property of the content URI to determine if the file was stored in a known folder on a first computing device and, if so, determine if the file is also stored in the same known folder on a second computing device.

The API can also locate files that have been synchronized between computing devices (e.g. using a synchronization service like ONEDRIVE or DROPBOX), but that are located at a different path on each computing device. In order to provide this functionality, the API determines whether the content URI indicates that the file is stored in a location that is synchronized between devices by a synchronization service. For example, the API might determine if the content URI includes a URI to the file at the synchronization service or other data indicating that the file is stored by the synchronization service. If the file is stored in a synchronized location, the API can provide the path and ID used by the synchronization service to identify the file in the content URI to the synchronization service and, in return, receive data identifying the local file path of the file.

If the API successfully locates the file, the API can provide data identifying the location of the file responsive to the original request. The file can then be accessed at the identified location. For instance, the application identified in the activation URI can be activated (e.g. executed if not already executing), and the application can access the file at the location determined by the API. If the API does not locate the file, operations can be performed to mitigate the inability to locate the file and resume the activity such as, for example, providing a UI to the user prompting the user to manually locate the file, or prompting the user to install a client for a synchronization service (e.g. in the case where the file is stored in a synchronized location, but the synchronization client is not installed on the second computing device).

As discussed briefly above, implementations of the technologies disclosed herein, can reduce the utilization of processor cycles, memory, and potentially other types of computing resources. Other technical benefits not specifically identified herein can also be realized through implementations of the disclosed technologies. These technical benefits can also result in benefits to users of computing devices that implement the disclosed technologies by reducing the frustration sometimes experienced by users when attempting to locate files.

It should be appreciated that the above-described subject matter can be implemented as a computer-controlled apparatus, a computer-implemented method, a computing device, or as an article of manufacture such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1A:
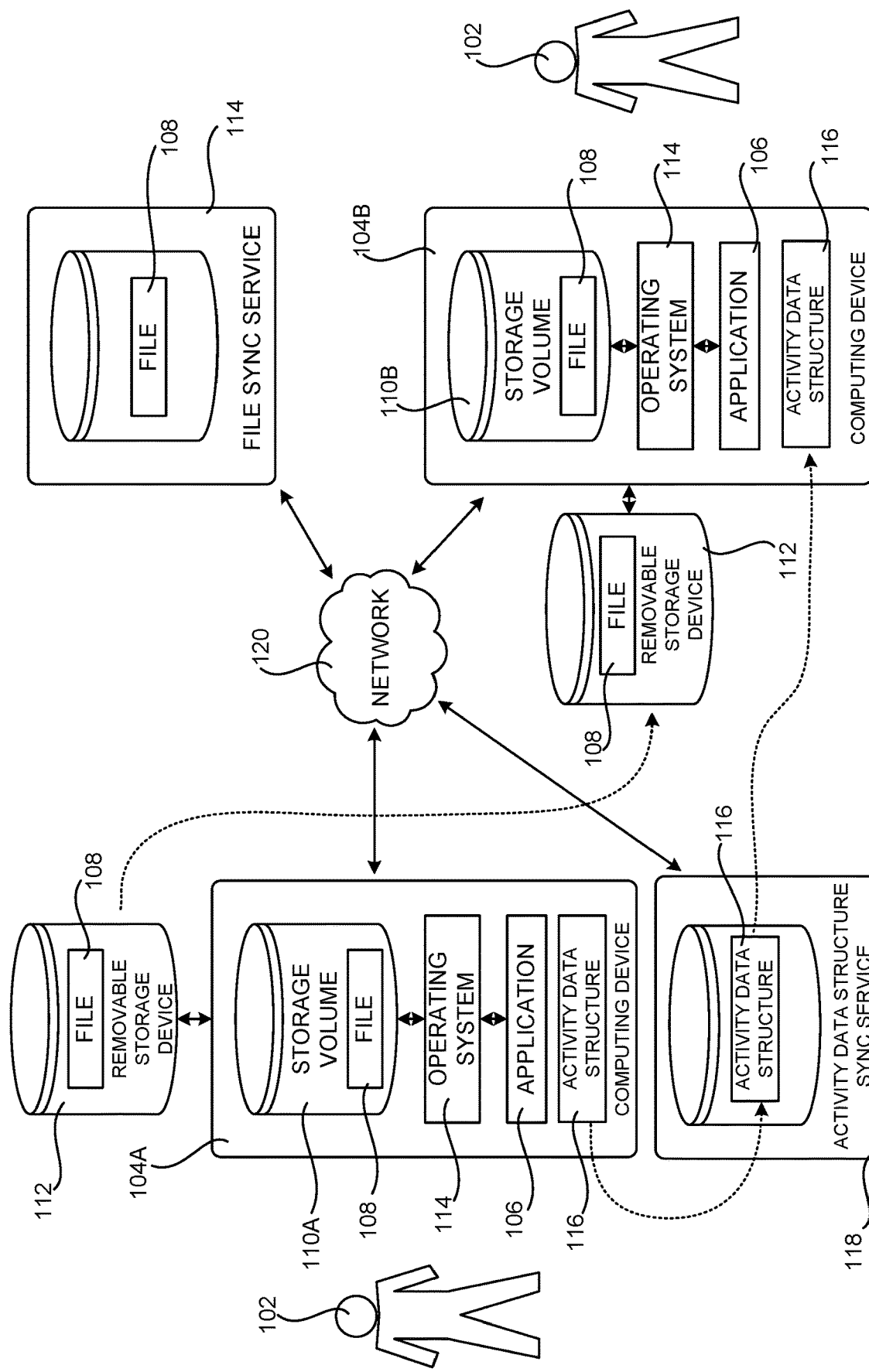
FIG. 1A is a computer system architecture diagram showing aspects of a system for locating files using a durable and universal file identifier, according to one embodiment.

The following detailed description is directed to technologies for locating files using a durable and universal file identifier. As discussed briefly above, implementations of the technologies disclosed herein can reduce the utilization of processor cycles, memory, and other computing resources by reducing or eliminating the need for users to search or browse for files. Other technical benefits not specifically identified herein might also be realized through an implementation of the disclosed technologies.

While the subject matter described herein is presented in the general context of program modules that execute in conjunction with the execution of an operating system and application programs on a computer system, those skilled in the art will recognize that other implementations can be performed in combination with other types of program modules. Generally, program modules include routines, programs, components, data structures, and other types of structures that perform particular tasks or implement particular abstract data types. Moreover, those skilled in the art will appreciate that the subject matter described herein can be practiced with other computer system configurations, including hand-held devices, multiprocessor systems, microprocessor-based or programmable consumer electronics, computing or processing systems embedded in devices (such as wearables, automobiles, home automation etc.), minicomputers, mainframe computers, and the like.

In the following detailed description, references are made to the accompanying drawings that form a part hereof, and which are shown by way of illustration specific configurations or examples. Referring now to the drawings, in which like numerals represent like elements throughout the several FIGS., aspects of various technologies for locating files using a durable and universal file identifier will be described.

Prior to discussing the FIGS., it is to be noted that various components in the configurations described below might collect and utilize data describing user activity taking place on a computing device. In these embodiments, users are explicitly informed of the type of data that will be collected. Users may also be required to expressly consent to the collection of such data following a disclosure of the data collection and prior to the actual data collection taking place. Moreover, no personally identifiable information is collected from users in these embodiments.

FIG. 1A is a computer system architecture diagram showing aspects of a system for locating files using a durable and universal file identifier, according to one embodiment. As discussed above, the durable and universal file identifier can be utilized to locate a file utilized in a previously performed computing activity in order to resume the activity such as, for instance, on a different computing device. In this regard, it is to be appreciated that while the embodiments disclosed herein are utilized to illustrate the use of a content URI to resume a previously performed activity, the disclosure presented herein is not limited to this embodiment. Rather, the content URI disclosed herein can be utilized to locate a file in virtually any scenario, not just when a file is to be utilized to resume an activity. Therefore, the embodiments described below with regard to the FIGS. are merely illustrative and should not be seem as limiting the claims to any particular embodiment.

As illustrated in FIG. 1A, a user 102 can utilize a first computing device 104A to execute an application 106. The application 106 can be a word processing application, spreadsheet application, presentation application, web browser application, or another type of application. The application 106 can be used to view, create, modify, or perform other operations on a file 108. The use of the application 106 to view, create, modify, or perform other operations on a file 108 is referred to herein as a "file-based activity," or just an "activity."

As shown in FIG. 1A, the file 108 can be stored on a storage volume 110A local to the computing device 104A (e.g. a storage volume on a hard-disk drive or solid-state drive). The file 108 can also be stored on a removable storage device 112 (e.g. a Universal Serial Bus ("USB") key) attached to the computing device 104A. The file 108 might also be synchronized with, and stored, at a file synchronization ("sync") service 114, such as the DROPBOX or ONEDRIVE file synchronization services.

The file sync service 114 can synchronize the file 108 between the computing device 104A and one or more other computing devices associated with the user 102, such as the computing device 104B. The file 108 might also be stored in other locations accessible to the computing device 104A, such as a network share or in other locations accessible via the Internet or another network 120.

As discussed briefly above and in more detail below, in various embodiments, a user 102 can perform a file-based activity at a first computing device 104A and resume the activity later on another computing device 104B. Using the disclosed technologies, the file 108 needed to resume the activity can be located at the second computing device 104B, even if the file is not in the same location on the second computing device 104B as it was on the first computing device 104A at the time the activity was performed. As also discussed briefly above, this mechanism can reduce or eliminate the need for a user 102 to search or browse the second computing device 104B for previously-used files 108 and, as a result, can improve the performance of a computing device 104B implementing the disclosed technologies by reducing the use of computing resources, such as processor cycles and memory. As also mentioned above, the disclosed technologies can be utilized to locate a file, even if the file was not used to perform an activity on another computing device associated with a user.

Figure 2:
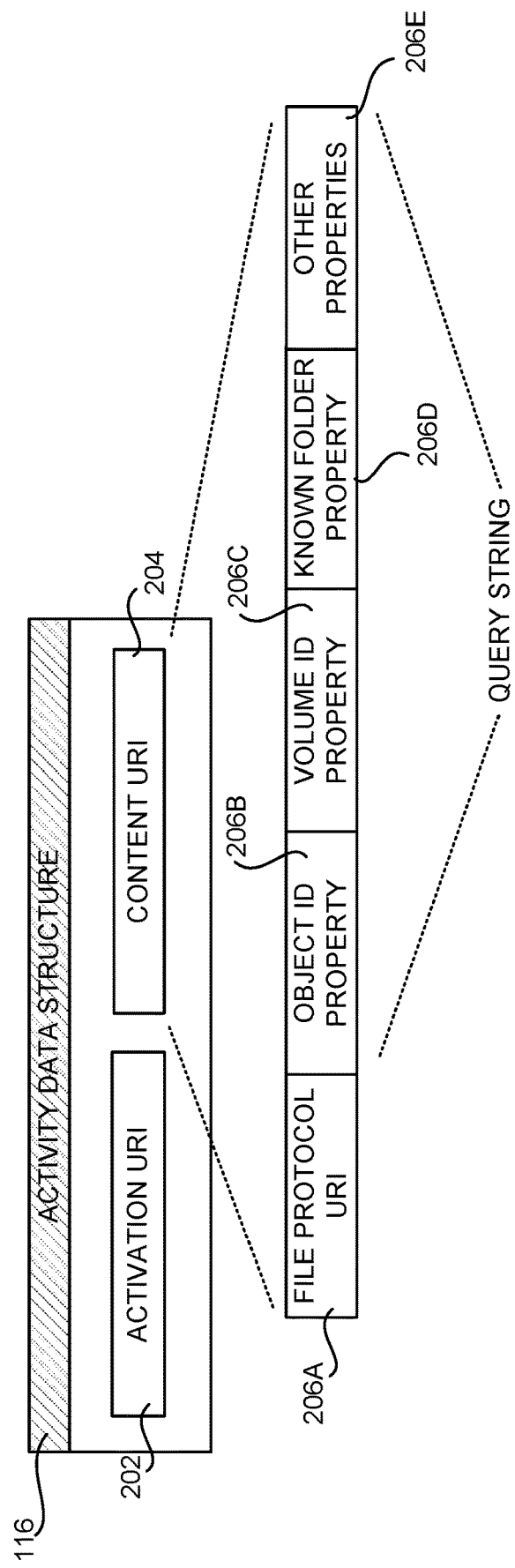
FIG. 2 is a data structure diagram showing an illustrative configuration for an activity data structure and a content URI, according one embodiment disclosed herein.

In order to realize the technical benefits mentioned briefly above, and potentially others, a computing device 104A upon which a file-based activity is performed is configured to generate an activity data structure 116 for use in resuming a previously performed file-based activity. Referring momentarily to FIG. 2, aspects of the configuration of the activity data structure 116 in one embodiment will be described.

As shown in FIG. 2, the activity data structure 116 includes, at least, an activation URI 202 and a content URI 204. The activation URI 202 identifies an application 106 that was used to perform an activity on a file 108 (e.g. a word processing application used to edit a file). For example, the activation URI 202 might identify a protocol associated with an application. The activation URI 202 can be utilized to activate (e.g. execute if not already executing) the application 106 associated with the file 108 to resume the previously-performed activity.

As discussed briefly above, the content URI 204 includes data that can be utilized to locate a file 108 even if the file 108 has been renamed, moved, or is accessed on a computing device 104B other than the computing device 104A upon which the activity was performed. In particular, the content URI 204 includes a file protocol URI 206A specifying a path to the file 108 in some embodiments. The file protocol URI 206A is compliant with the RFCs relating to file protocol URIs and can be utilized independently of the query string described below.

As discussed briefly above, the properties 206B-206C can be expressed as a query string for the file protocol URI 206A. In this manner, the content URI 204 can be formatted as a valid protocol URI that is compatible with RFC 3986 and other RFCs relating to URIs. In this manner, applications or other components that are not configured to utilize the query string described below can still utilize the file protocol URI 206A to locate the referenced file. The activation URI 202 can include the content URI 204 as a query string parameter in some embodiments.

The query string of the file protocol URI 206A includes one or more parameters that can be utilized to perform second-order lookups to locate the file 108. For example, and without limitation, the query string can include an object ID property 206B specifying a GUID or another type of unique identifier corresponding to the file 108. The object ID property 206B can include a file ID or another other type of data that uniquely identifies or references a file 108. The query string can also include a volume ID property 206C specifying a GUID or another type of unique identifier for a storage volume 110A storing the file 108 at the first computing device 104A.

The content URI 204 can also include a "known folder" property 206D in some embodiments, which indicates if the file 108 is stored in a known folder. As discussed briefly above, a known folder represents a symbolic link to a well-known location that may be located in distinct locations across operating system installations. In an installation of the MICROSOFT WINDOWS operating system, for example, known folders might include the desktop, documents, downloads, and pictures folders. Other operating systems might utilize other known folders. The query string can also include other properties 206E or different properties in other embodiments.

An example content URI 204 is set forth below in Table 1.

TABLE 1

Example Content URI file:///c:/users/user1/documents/abc123.txt?volumeid={guid}?knownfolder={guid}?objectid={guid}

The query string of the file protocol URI 206A can include other properties 206 that can be utilized to locate a file 108. For example, and without limitation, the properties 206 can include one or more other properties of a file 108, one or more properties associated with a file 108 by a file system, or secondary metadata for the file 108 obtained from another source.

Referring back to FIG. 1A, an application 106, an activity monitor (not shown in FIG. 1A, but described below with regard to FIG. 3D), operating system component such as an API (not shown in FIG. 1A but described in detail below with regard to FIGS. 3A-3E), or another component creates an activity data structure 116 for an activity, typically at or around the time the activity is performed by the user 102. The application 106 creating the activity data structure 116 also creates the activation URI 202. In order to create the content URI 204, the application 106 utilizes the services of an operating system 114—provided API in some embodiments disclosed herein.

For example, and without limitation, the application 106 can submit a request to create a content URI 204 to the API. The request can include data, such as a file protocol URI, that specifies a path to the file 108 on a storage volume 110A accessible at the first computing device 104A. In response to receiving such a request, the API locates an object ID property 206B for the file 108 that includes a GUID or other type of identifier corresponding to the file 108.

The API can also locate a volume ID property 206C specifying a GUID or other type of identifier for the storage volume 110A upon which the file 108 is stored. In some embodiments, the API can also determine if the file 108 is stored in a known folder and, if so, create the known folder property 206D identifying the known folder in which the file 108 is stored. The values for these properties are maintained by the operating system 114 in some embodiments and obtained by performing a property-lookup based upon the file protocol URI 206A. Other properties 206E can also be maintained for the file 108 and utilized in the manner described herein.

Once the API has located the object ID property 206B, the volume ID property 206C, the known folder property 206B, or other properties 206E, the API can create the content URI 204 for the file 108. As discussed above, the content URI 204 includes the file protocol URI 206A and a query string including the object ID property 206B, the volume ID property 206C, and a known folder property 206D identifying a known folder if the file 108 is stored in the known folder. The query string can include other properties 206E in other embodiments. Additional details regarding this process will be provided below with regard to FIG. 3A.

In scenarios where a file 108 is stored in a location on the first computing device 104A that is synchronized by a file sync service 114 (e.g. ONEDRIVE or DROPBOX), the API can provide the local path of the file 108 to the synchronization service 114. In response thereto, the file sync service 114 can locate its internal path to the file and an identifier for the file 108 and provide this information to the API. The API then stores the path to the file 108 and unique ID for the file 108 in the content URI 204. As will be described in greater detail below, this information can later be used to obtain the local path of the file 108 on a second computing device 104B from the file sync service 114. Additional details regarding this process will be provided below with regard to FIG. 3B.

Once the content URI 204 has been created, the API can then return the content URI 204 to the application 106 in response to the request received at the API. As will be discussed in detail below, the content URI 204 can later be used to locate the file 108 at the computing device 104A or at a second computing device 104B.

Once an activity data structure 116 has been created, portions of the activity data structure 116 are then exposed to users 102 through a UI (not shown in FIG. 1) in some embodiments. For example, a UI can be presented that includes UI controls generated from activity data structures 116, such as thumbnail images and/or text, that correspond to activities previously engaged in by a user 102.

The UI controls can, for instance, identify the application 106 and the file 108 used during an activity. Selection of one of the UI controls (e.g. a thumbnail image) in the UI by a user 102 will resume the previous activity using the associated activity data structure 116. For example, a word processing application 106 might be executed and provided with a file 108 that was edited during the activity. Other types of UIs for resuming previously performed activities can be utilized in other embodiments.

UI controls corresponding to activities performed on each of a user's computing devices, such as the computing devices 104A and 104B in the example shown in FIG. 1A, can also be presented by synchronizing activity data structures 116 describing the user's activities between the devices 104A and 104B. In order to provide this functionality, the computing devices 104A and 104B can execute an activity data synchronization module (not shown in FIG. 1A) in some embodiments. The activity data synchronization module retrieves the activity data structures 116 from the computing device 104A and transmits the activity data structures 116 to an activity data structure sync service 118 over a network 120, like the Internet.

The activity data synchronization service 118 receives the activity data structures 116 from the computing device 104A and stores the activity data structures 116 in an appropriate data store. The activity data synchronization service 118 also receives and stores activity data structures 116 from other computing devices associated with the same user 102, such as the computing device 104B shown in FIG. 1A.

The activity data synchronization service 118 then synchronizes the activity data structures 116 between all of the computing devices 104 associated with the user 102. The computing devices 104A and 104B can then provide a UI for resuming activities based upon the content of the activity data structures 116 in the manner described above. Through the use of such a UI, and the mechanism described below for locating the file 108, a user 102 can resume previously performed activities on any of their computing devices 104. As discussed above, the activity data structure 116 and the content URI 204 can be transmitted to other computing systems in other ways in other embodiments. In general, they may be transmitted in the same way that hyperlinks are currently shared between computing devices.

As discussed above, when a user 102 tries to resume an activity on one computing device 104B that was performed on another computing device 104A or access a file 108 referenced by a content URI 204 in other ways, the file 108 might not be stored in the same location as it was on the computing device 104A. This might occur for various reasons. For example, if a file 108 is located on a storage volume 110A that was originally accessible at a first computing device 104A, but which is later inaccessible on a storage volume 110B at a second computing device 104B. For instance, a removable storage device 112 might store a file 108 that is accessed on one computing device 104A, and then later accessed on another computing device 1104B. The removable storage device 112 might, however, be assigned a different drive letter on the second computing device 104B and, therefore, the path of the file 108 will change.

The location of a file 108 might also change on the computing device 104B because the location of the file 108 is different on the computing device 104B than the synchronized location of the file 108 on the computing device 104A. The location of a file 108 might also be different between the computing devices 104A and 104B for other reasons not specifically identified herein. The technologies disclosed herein provide mechanisms for locating the file 108 at a computing device such as the second computing device 104B. In this manner, operations can be performed using the file 108, such as resuming an activity that used the file on another computing device 104B.

In order to locate a file 108, the operating system 114 executing on the computing device 110B provides an API (not shown in FIG. 1A) in some embodiments. In these embodiments, an application 106 or another component can provide a request to the API for the location of a file 108. The request can include the content URI 204 described above for the file 108.

When the API receives a request for the location of the file 108, it can utilize the content URI 204 to locate the file 108, even if the file 108 has been renamed or moved. For example, the API can utilize the file protocol URI 206A contained in the content URI 204 to determine if the file 108 is accessible at its original path (i.e. the path specified by the file protocol URI 206A) on the second computing device 104B. This can be used, for example, to locate a file 108 that is in the location specified by the file protocol URI 206A. As mentioned above, the file protocol URI 206A can be utilized by any computing system to locate a file 108, even applications that are not configured to utilize the parameters set forth in the query string of the file protocol URI 206A.

The API can also use the GUID stored in the volume ID property 206C of the content URI 204 to determine if a file 108 is located on a storage volume 110 that was originally accessible at a first computing device 104A, but which is later accessed at a second computing device 104B. As discussed above, this might occur when a removable storage device 112 is assigned a different drive letter on the second computing device 104B. In order to locate a file in this scenario, the API determines whether a storage volume 110 having a GUID matching the GUID in the volume ID property 206C of the content URI 204 and, if so, searches that storage volume 110 for the file 108. The API can also utilize the known folder property 206D of the content URI 204 to determine if the file 108 was stored in a known folder on the first computing device 104A and, if so, determine if the file 108 is also stored in the same known folder on the second computing device 104B. The API can also utilize other properties 206E stored in the query string of the file protocol URI 206A.

The API can also locate files 108 that have been synchronized between computing devices 104A and 104B (e.g. using a synchronization service like ONEDRIVE or DROPBOX), but that are located at a different path on each computing device 104. In order to provide this functionality, the API determines whether the file 108 is stored in a location that is synchronized between devices 104 by the file sync service 114. If the file 108 is stored in a synchronized location, the API can provide the path to the file 108 utilized by the file sync service 114 to the file sync service 114 and, in return, receive data identifying the local path of the file 108 on the second computing device 104B. Additional details regarding this process will be provided below with regard to FIG. 3C.

If the API successfully locates the file 108, the API can provide data identifying the local path of the file 108, for example at the second computing device 104B, responsive to the original request. The file 108 can then be accessed at the identified location. For instance, the application 106 identified in the activation URI 202 can be activated (e.g. executed if not already executing on the computing device 104B), and the application 106 can access the file 108 at the location determined by the API.

If the API does not locate the file 108, the computing device 104B can perform operations to mitigate its inability to resume the activity such as, for example, providing a UI to the user 102 prompting the user 102 to manually locate the file, or prompting the user to install a client for the file sync service 114 (e.g. in the case where the file 108 is stored in a synchronized location but a synchronization client is not installed on the computing device 104B). Additional details regarding these processes are provided below with regard to FIGS. 1B-4B.

Figure 1B:
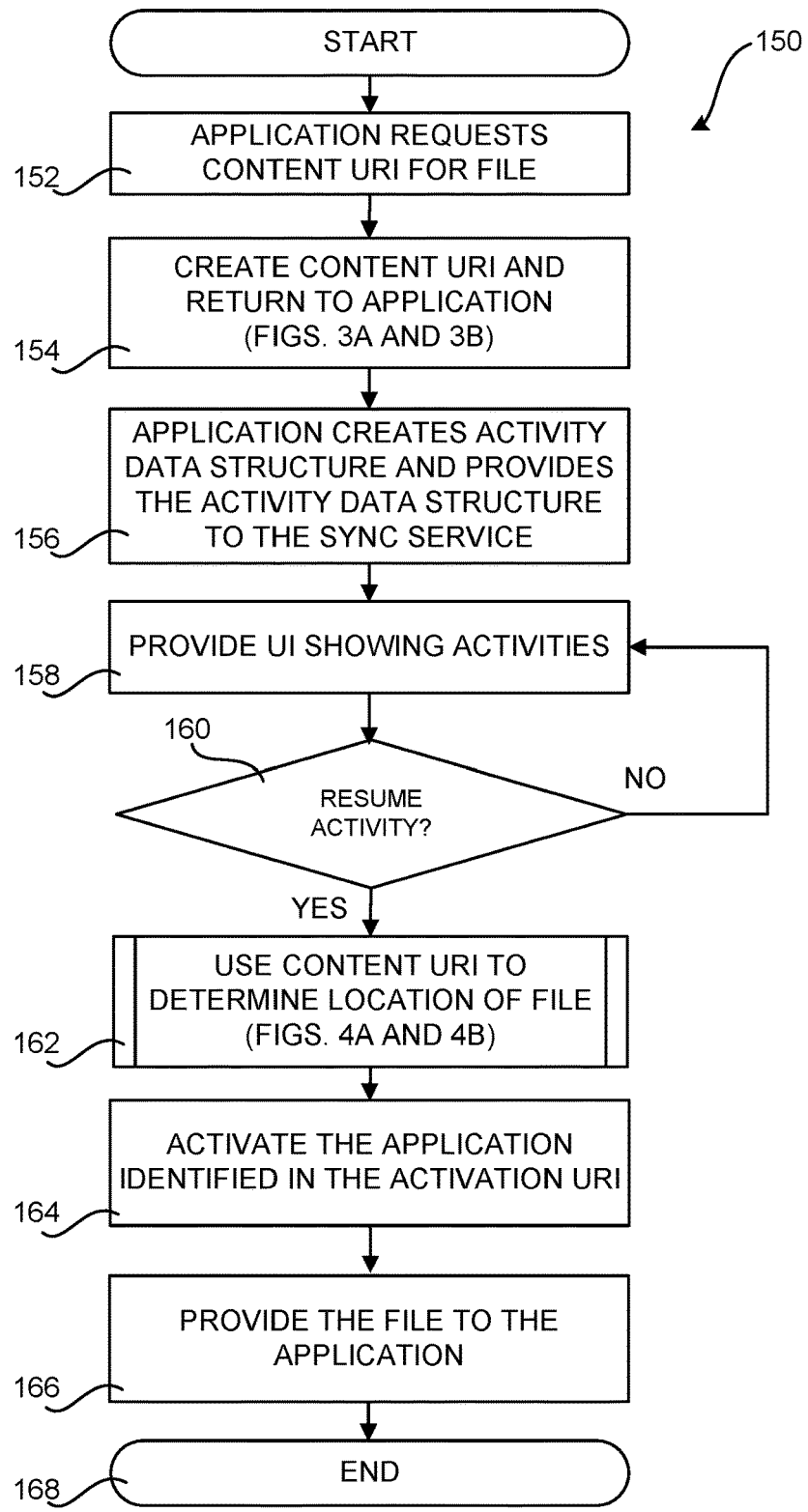
FIG. 1B is a flow diagram showing a routine that illustrates aspects of the operation of the computing devices shown in FIG. 1A for locating files using a durable and universal file identifier, according to one embodiment disclosed herein.

FIG. 1B is a flow diagram showing a routine 150 that illustrates aspects of the operation of the computing devices 104 shown in FIG. 1A for locating files using a durable and universal file identifier, according to an embodiment disclosed herein. In the embodiment shown in FIG. 1B, the identified location of the file 108 is determined and utilized to resume a previously performed activity. It is to be appreciated, however, that the same mechanism can be utilized to locate a file 108 for use in other ways in other implementations.

It should be appreciated that the logical operations described herein with regard to FIG. 1B, and the other FIGS., can be implemented (1) as a sequence of computer implemented acts or program modules running on a computing device and/or (2) as interconnected machine logic circuits or circuit modules within the computing device. The particular implementation of the technologies disclosed herein is a matter of choice dependent on the performance and other requirements of the computing device. Accordingly, the logical operations described herein are referred to variously as states, operations, structural devices, acts, or modules. These states, operations, structural devices, acts and modules can be implemented in software, in firmware, in special purpose digital logic, and any combination thereof. It should also be appreciated that more or fewer operations can be performed than shown in the FIGS. and described herein. These operations can also be performed in a different order than those described herein.

The routine 150 begins at operation 152, where an application 106 requests a content URI 204 for a file 108. As discussed above, the application 106 can request the content URI 204 from an operating system—provided API in some embodiments. The application 106 itself can create the content URI 204 in other embodiments. Components other than the API or the application 106 can create the content URI 204 in other embodiments.

From operation 152, the routine 150 proceeds to operation 154, where the API or other component creates the requested content URI 204. Additional details regarding one mechanism for creating the content URI 204 will be described below with regard to FIGS. 3A and 3B. From operation 154, the routine 150 proceeds to operation 156.

At operation 156, the application 106 creates an activity data structure 116 that includes the content URI 204. The application 106 then provides the activity data structure 116 to the activity data structure sync service 118. The activity data structure sync service 118 then synchronizes the activity data structure 116 with other computing devices associated with the user 102, such as the computing device 104B. The routine 150 then proceeds from operation 156 to operation 158.

At operation 158, the computing devices 104 can present a UI through which the user 102 can make a request to resume a previously-performed activity. For instance, the user 102 might request to resume an activity on the computing device 104B that was originally performed on the computing device 104A. If the user 102 requests to resume a previously-performed activity, the routine 150 proceeds from operation 160 to operation 162.

At operation 162, the API or another component uses the content URI 204 in the activity data structure 116 to determine the location of the file 108 such as, for instance, on the computing device 104B. Details regarding operations for locating the file 108 using the content URI 206A will be provided below with regard to FIGS. 4A and 4B. The routine 150 then proceeds from operation 162 to operation 164.

At operation 164, the application 106 identified in the activation URI 202 is activated (e.g. executed if not already executing). The file 108 located using the content URI 204 is then provided to the application at operation 166. The routine 150 then proceeds from operation 166 to operation 168, where it ends.

Figure 3A:
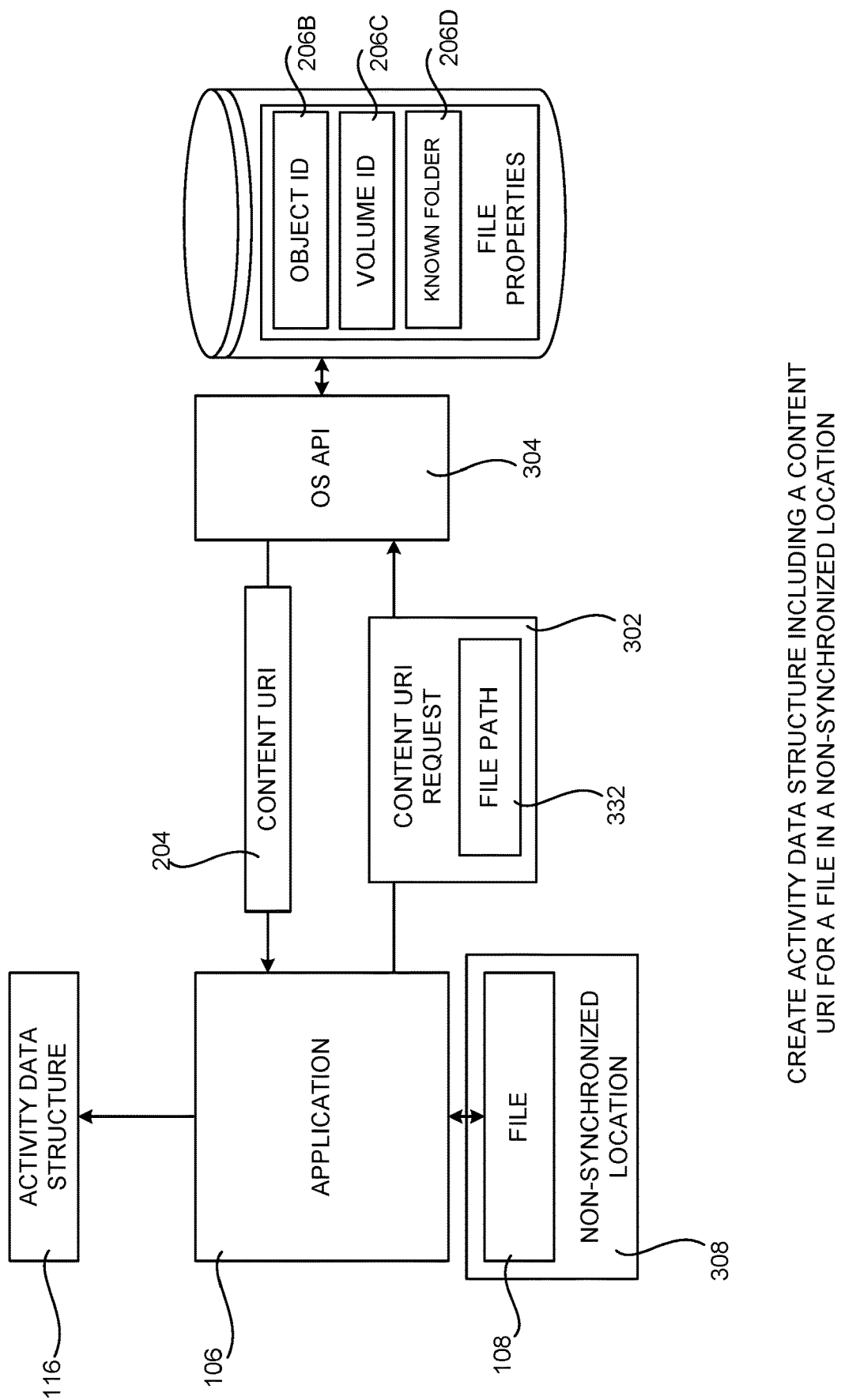
FIG. 3A is a software architecture diagram showing aspects of the operation of the computing devices shown in FIG. 1A for creating an activity data structure that includes a content URI for a file stored in a non-synchronized location, according to one embodiment disclosed herein.

FIG. 3A is a software architecture diagram showing aspects of the operation of the computing devices 104 shown in FIG. 1A for creating an activity data structure 116 for a file 108 stored in a non-synchronized location 308 (i.e. a location that is not synchronized by the file sync service 114), according to one embodiment disclosed herein.

As shown in FIG. 3A, and described briefly above, an application 106 utilizes the services of an operating system 114—provided API 304 in some embodiments disclosed herein to generate a content URI 204. In particular, the application 106 can submit a request 302 to create a content URI 204 to the API 304. The request can include a file protocol URI 206A that specifies a path 332 to the file 108 on a storage volume 110A accessible at the first computing device 104A.

In response to receiving such the request 302, the API 304 locates properties that can be utilized to locate the file 108 for inclusion in the query string of the file protocol URI 206A. For example, the API 304 might locate an object ID property 206B for the file 108 that includes a GUID or other type of unique identifier corresponding to the file 108. The API 304 can also locate a volume ID property 206C specifying a GUID or another type of unique identifier for the storage volume 110A upon which the file 108 is stored. In some embodiments, the API 304 can determine if the file 108 is stored in a known folder and, if so, create the known folder property 206D identifying the known folder in which the file 108 is stored. The values for these properties are maintained by the operating system 114 in some embodiments and obtained by performing a property-lookup based upon the file protocol URI 206A. Other properties 206E of the file 108 that can be utilized to locate the file 108 can be obtained in a similar fashion in some embodiments.

Once the API 304 has located the object ID property 206B, the volume ID property 206C, the known folder property 206D, and any other properties 206E, the API 304 can create the content URI 204 for the file 108. As discussed above, the content URI 204 includes a file protocol URI 206A that includes a query string specifying one or more of the object ID property 206B, the volume ID property 206C, a known folder property 206D, or the other properties 206E.

Once the content URI 204 has been created, the API 304 can then return the content URI 204 to the application 106 in response to the request 302. The application 106 can then create the user activity data structure 116 using the content URI 204. The content URI 204 can be utilized independently of the user activity data structure 116 in some embodiments. As will be discussed in detail below, the content URI 204 can later be used to locate the file 108 at the computing device 104A or at another computing device such as the second computing device 104B to resume an activity that utilized the file 108 or for other purposes.

Figure 3B:
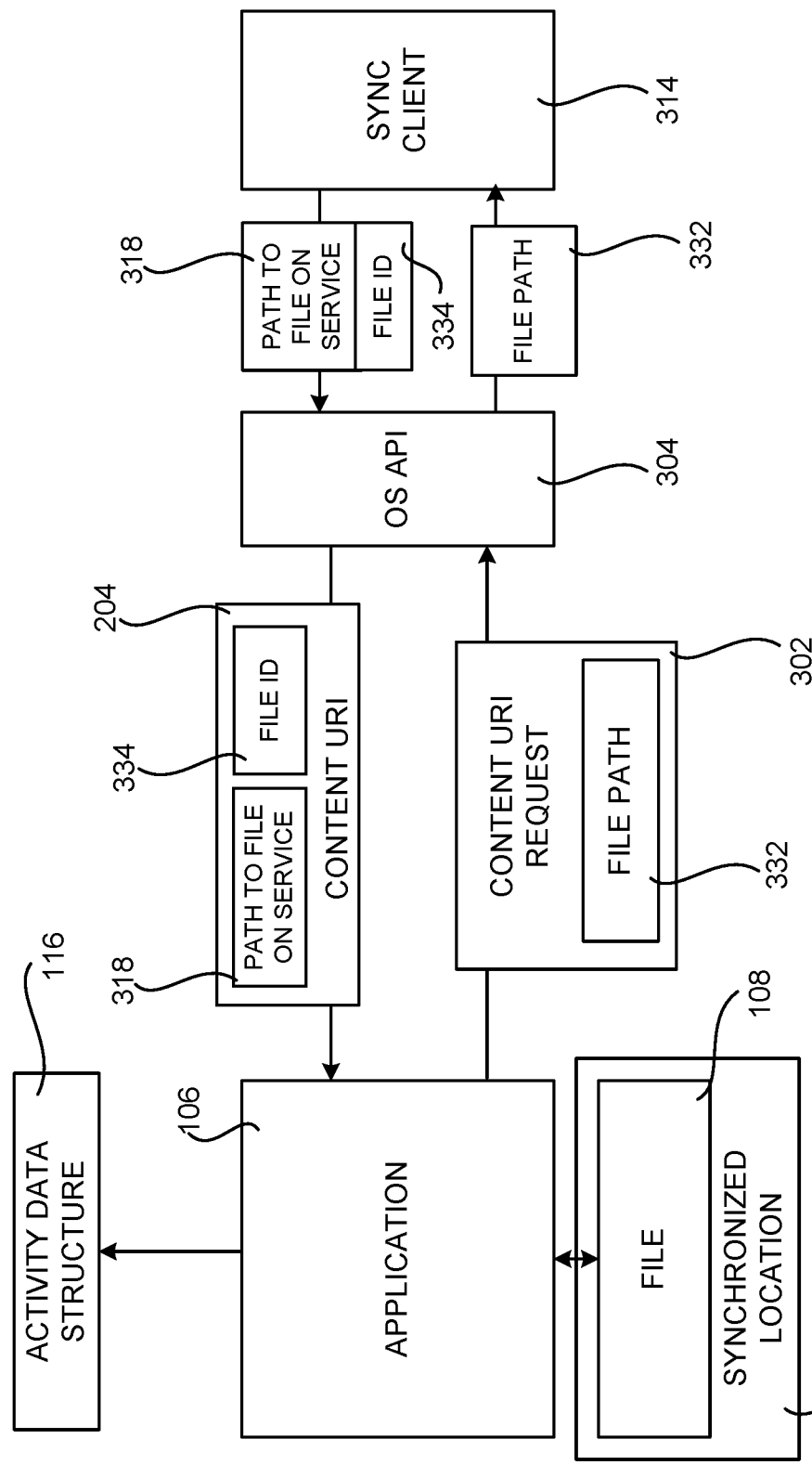
FIG. 3B is a software architecture diagram showing aspects of the operation of the computing devices shown in FIG. 1A for creating an activity data structure that includes a content URI for a file stored in a synchronized location, according to one embodiment disclosed herein.

FIG. 3B is a software architecture diagram showing aspects of the operation of the computing devices 104 shown in FIG. 1A for creating an activity data structure 116 for a file 108 stored in a synchronized location 310, according to one embodiment disclosed herein. In this scenario, the API 304 can provide the local file path 332 to a client 314 of the synchronization service 114. For example, and without limitation, the API 304 might provide the file path 332 to a synchronization client 314 executing on the computing device 104 upon which the activity is to be resumed.

The sync client 314, in response to the request 302, locates the internal path 318 of the file 108 used by the file sync service 114. The path 318 is a fully qualified HTTP URL assigned to the file 108 by the sync service 114 in some embodiments. The sync client 314 might also identify a unique ID, such as a GUID, assigned to the file 108 by the sync service 114. Other types of identifiers can be utilized in other embodiments. In some embodiments, the sync client 314 communicates with the file sync service 114 in order to obtain the path 318 and file ID 334 in some embodiments.

In response to receiving the path 318 and the ID 332, the API 304 stores the path 318 and the ID 332 in the content URI 204. The API 314 then returns the content URI 204 to the application 106 in response to the request 302. As will be described in greater detail below with regard to FIG. 3C, the path 318 and the file ID 334 can later be used to obtain the local path of the file 108 on a second computing device 104B from the file sync service 114.

Figure 3C:
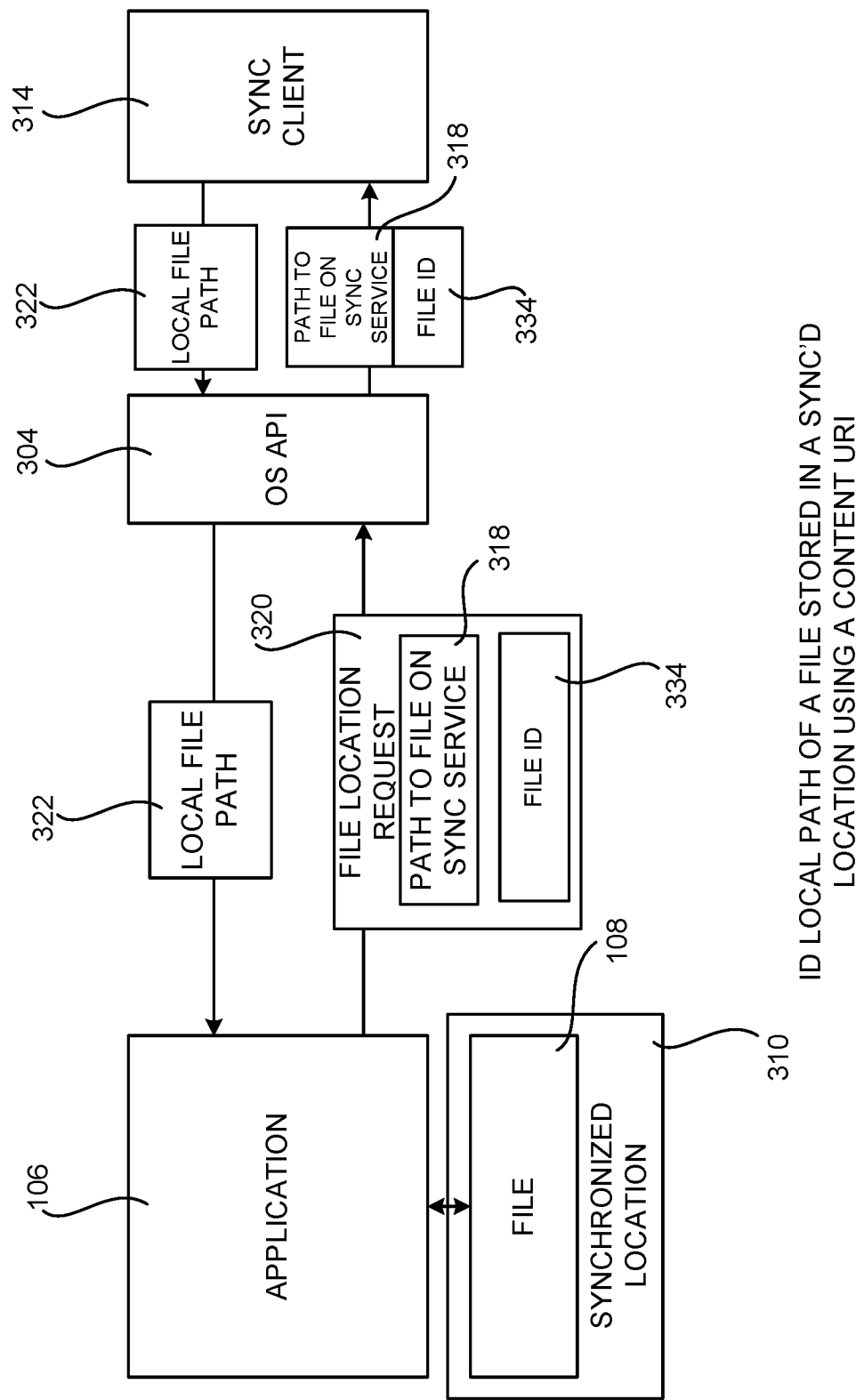
FIG. 3C is a software architecture diagram showing aspects of the operation of the computing devices shown in FIG. 1A for identifying the local path of a file stored in a synchronized location, according to one embodiment disclosed herein.

FIG. 3C is a software architecture diagram showing aspects of the operation of the computing devices 104 shown in FIG. 1A for identifying the location of a file 108 stored in a location 310 that is synchronized between computing devices 104 by the file sync service 114, according to one embodiment disclosed herein. In order to provide this functionality, the application provides a request 320 for the location of the file 108 to the API 304 that includes the path 318 for the file 108 and the file ID 334 retrieved from the file sync service 114 in the manner described above with regard to FIG. 3B.

In response to receiving the request 320, the API 304 determines based on the path 318 and ID 334 whether the file 108 is stored in a synchronized location 310. If the file 108 is stored in a synchronized location, the API 304 can provide the path 318 and ID 334 to the file sync client 314 or the file sync service 114 and, in return, receives data identifying the local path 332 of the file 108 on the second computing device 104B. The API 304 can then return the local file path 322 to the application 106 in response to the request 320.

Figure 3D:
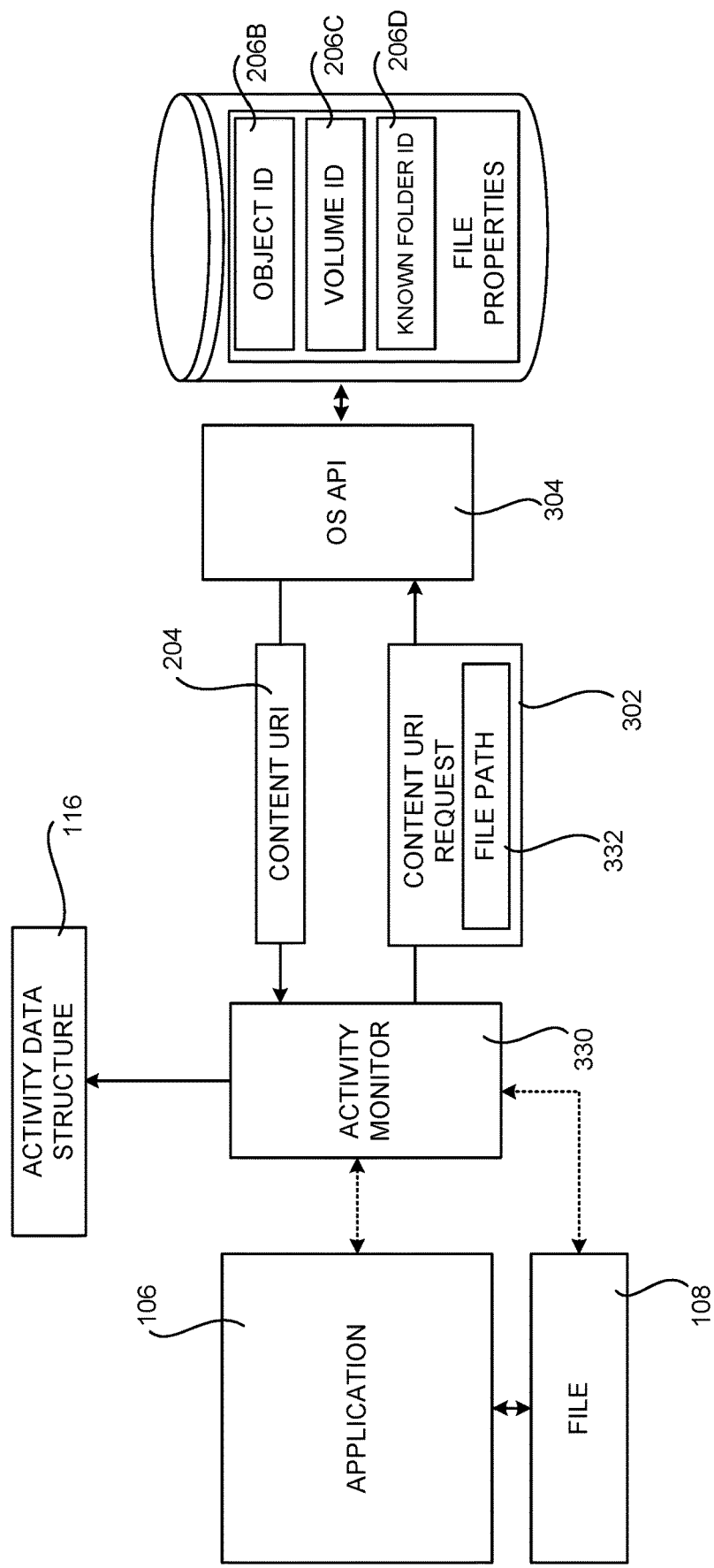
FIG. 3D is a software architecture diagram showing aspects of the operation of the computing devices shown in FIG. 1A for creating an activity data structure that includes a content URI for an application using an activity monitor, according to one embodiment disclosed herein.

FIG. 3D is a software architecture diagram showing aspects of the operation of the computing devices 104 shown in FIG. 1A for creating an activity data structure 116 including a content URI 204 on behalf of an application 106 using an activity monitor 330, according to one embodiment disclosed herein. In the embodiments described above with regard to FIGS. 3A-3C, the application 106 is configured to generate the activity data structure 116. In the embodiment shown in FIG. 3D, however, the application 106 does not natively provide support for creating the user activity data structure 116. Rather, another component, referred to herein as the activity monitor 330, creates the user activity data structure 116 on behalf of the application 106.

In order to provide this functionality, the activity monitor 330 can monitor operations performed by the application 106 (e.g. file system requests) to identify files 108 utilized by the application 106. In response thereto, the activity monitor 330 can request a content URI 204 from the API 304 in the manner described above. The activity monitor 330 can then create the user activity data structure 116 on behalf of the application 106 using the content URI 204. In this way, activities can be resumed for even those applications 106 that are not specifically configured to generate user activity data structures 116.

Figure 4A:
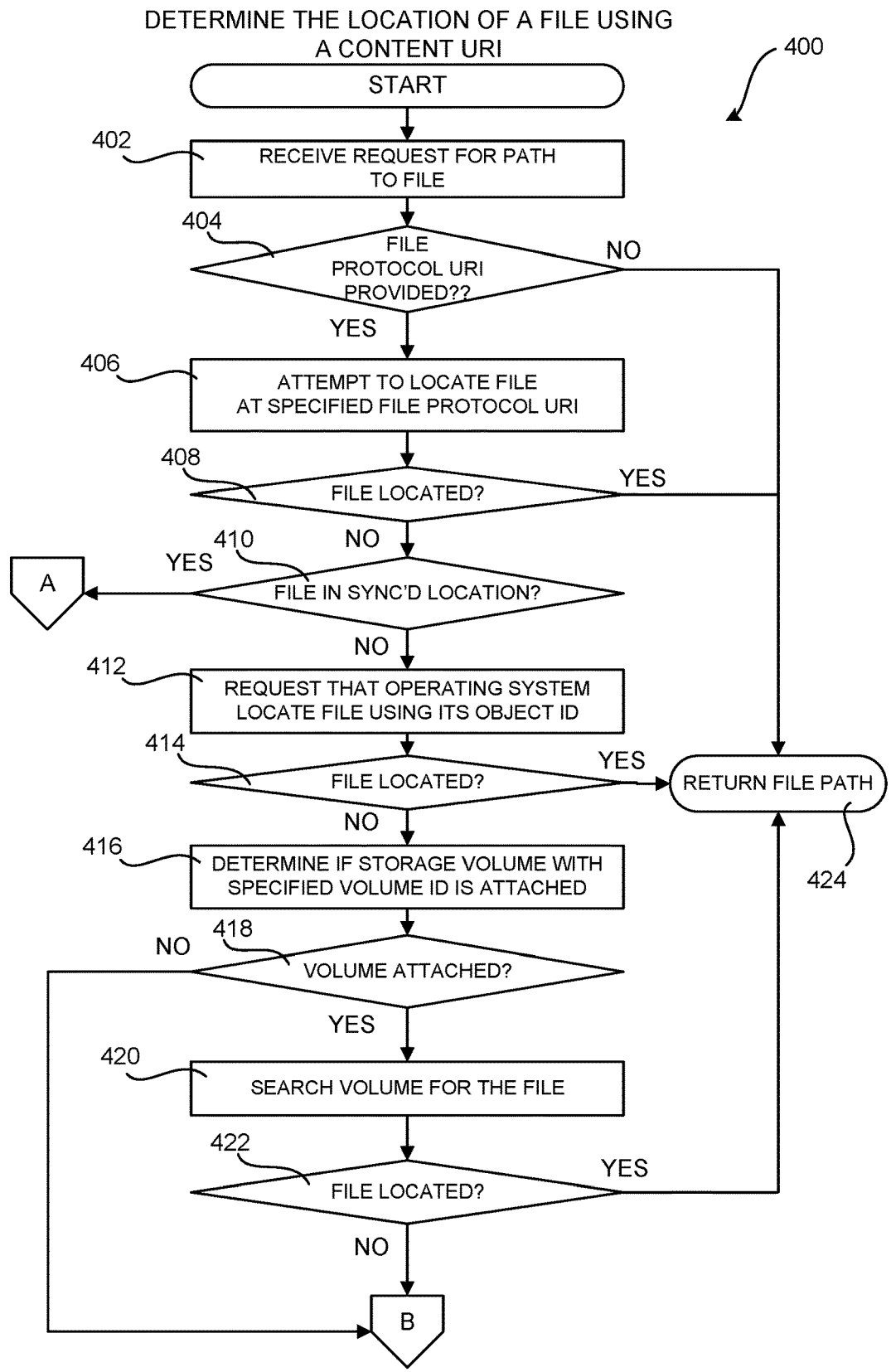
FIGS. 4A and 4B are flow diagrams showing a routine that illustrates aspects of the operation of the computing devices shown in FIG. 1A for determining the location of a file at a computing device using a file protocol URI contained in a content URI, according to one embodiment disclosed herein.
Figure 4B:
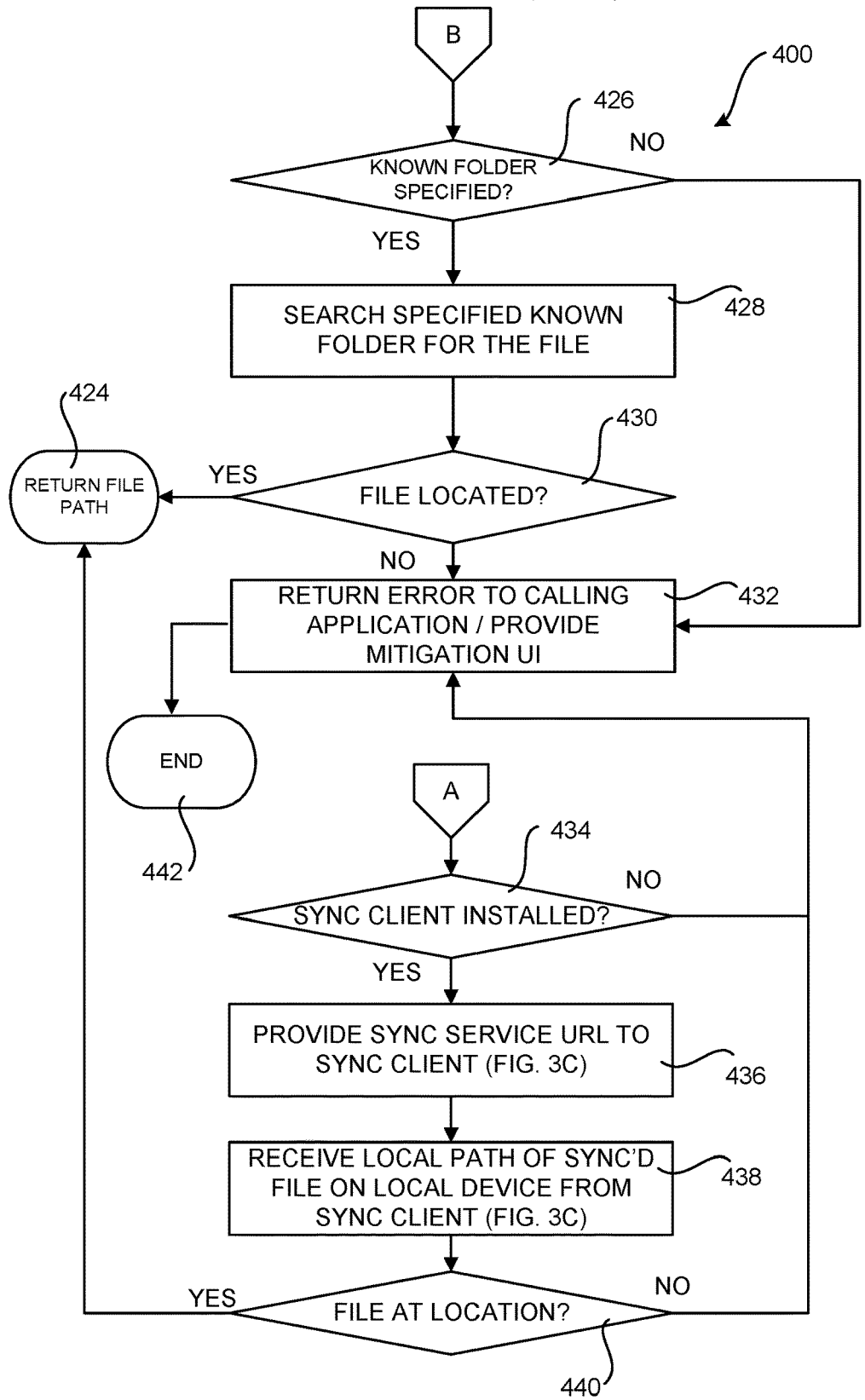

FIGS. 4A and 4B are flow diagrams showing a routine 400 that illustrates aspects of the operation of the computing devices 104 shown in FIG. 1A for determining the location of a file 108 at a computing device 104 using a file protocol URI 206A contained in a content URI 204, according to one embodiment disclosed herein. The routine 400 begins at operation 402, where a request is received for a path to a file 108. For example, in the embodiments described above, the API 304 receives a file location request 320. If the request includes a content URI 204 including a file protocol URI 206A, the routine 400 proceeds from operation 404 to operation 406.

At operation 406, the API 304 attempts to locate the file 108 at the location specified by the file protocol URI 206A in the content URI 204. If the file 108 is located at the path specified by the file protocol URI 206A, the routine 400 proceeds from operation 408 to operation 424, where the file 108 or data identifying the location of the file 108 can be returned to the application 106. If the file 108 is not located at the location specified by the file protocol URI 206A, the routine 400 proceeds from operation 408 to operation 410.

At operation 410, the API 304 determines, based upon the current path of the file 108, whether the file 108 is stored in a synchronized location 310. If the file 108 is stored in a synchronized location 310, the routine 400 proceeds from operation 410 to operation 434. If the file 108 is not in a synchronized location 310, the routine 400 proceeds from operation 410 to operation 412.

At operation 412, the API 304 can request that the operating system 114 search for the file 108 using the object ID property 206B specified in the query string of the file protocol URI 206A. The routine 400 then proceeds from operation 412 to operation 414, where the API 304 determines whether the operating system 114 was able to locate the file 108. If the operating system 114 was able to locate the file 108, the routine 400 proceeds to operation 424, where the file 108 or data identifying the location of the file 108 can be returned to the application 106. If the operating system 114 was unable to locate the file 108, the routine 400 proceeds from operation 414 to operation 416.

At operation 416, the API 304 determines if a storage volume 110 having a volume ID that is the same as the volume ID property 206C specified in the query string of the file protocol URI 206A is accessible to the computing device 104B. If such a volume is attached to the computing device 104B, the routine 400 proceeds to operation 420, where the API 304 or the operating system 114 can search the volume for the file 108 using the object ID property 206B for the file 108. If the operating system 114 is able to locate the file 108, the routine 400 proceeds to operation 424, where the file 108 or data identifying the location of the file 108 can be returned to the application 106. If the file 108 is not located on the volume, or if no such volume is attached to the computing device 104B, the routine 400 proceeds from operation 422 to operation 426 (shown in FIG. 4B).

At operation 426, the API 304 determines, based on the known folder property 206D in the query string of the file protocol URI 206A, if the file 108 was stored in a known folder on the computing device 104A. If the file 108 was stored in a known folder, the routine 400 proceeds to operation 428, where the computing device 104B searches the same known folder for the file 108 using the object ID property 206B for the file 108. If the file is located, the routine 400 proceeds from operation 430 to operation 424, where the file 108 or data identifying the location of the file 108 can be returned to the application 106. If a known folder was not specified in the content URI 204 or if a known folder was specified but was not located in the known folder on the computing device 104B, the routine 400 proceeds to operation 432.

At operation 432, an error can be provided to the calling application 106. Additionally, various types of mitigation operations might be performed such as, for instance, providing a UI indicating that the file 108 could not be located or providing a UI allowing the user to search for the file 108. The routine 400 then ends at operation 442.

If, at operation 410, the API 304 determines that the file is stored in a synchronized location 310, the routine 400 proceeds from operation 410 to operation 434 (shown in FIG. 4B). At operation 434, the API 304 determines whether a sync client 314 is installed on the computing device 104B. If not, the routine 400 can proceed from operation 430 to operation 432, where mitigation operations can be performed such as, for instance, providing a UI to the user prompting the user to install a sync client 314.

If the sync client 314 is installed, the routine 400 proceeds from operation 434 to operation 436. At operation 432, the API 304 provides the sync service path and ID for the file 108 to the sync client 314. The sync client 314, in turn, utilizes the sync service path and ID to determine the local path of the file 108 on the computing device 104B. The sync client 314 returns the local path of the file 108 to the API 304 at operation 438.

From operation 438, the routine 400 proceeds to operation 440, where the API 304 determines if the file 108 is located at the path specified by the sync client 314. If so, the routine 400 proceeds from operation 440 to operation 424, where the file 108 or data identifying the location of the file 108 can be returned to the calling application 106. If not, the routine 400 proceeds from operation 440 to operation 432, where mitigation operations can be performed such as those described above. Other secondary lookups for the file 108 utilizing the other properties 206E contained in the query string of the file protocol URI 206A can be performed in other embodiments.

Figure 5:
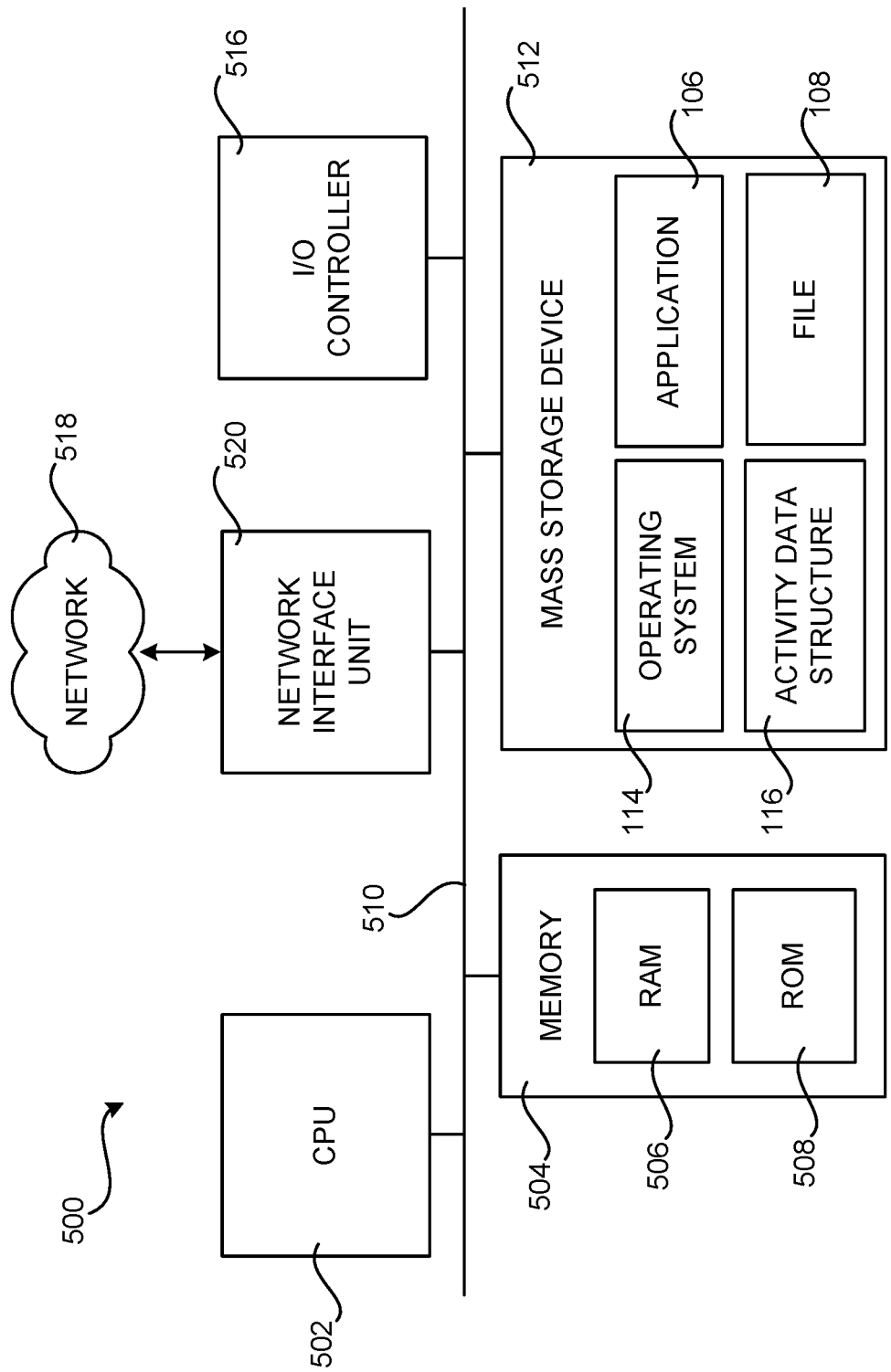
FIG. 5 is a computer architecture diagram showing an illustrative computer hardware and software architecture for a computing device, such as the computing devices shown in FIG. 1A, that can implement aspects of the technologies presented herein.

FIG. 5 is a computer architecture diagram that shows an architecture for a computer 500 capable of executing the software components described herein. The architecture illustrated in FIG. 5 is an architecture for a server computer, mobile phone, an e-reader, a smartphone, a desktop computer, a netbook computer, a tablet computer, a laptop computer, or another type of computing device suitable for executing the software components presented herein.

In this regard, it should be appreciated that the computer 500 shown in FIG. 5 can be utilized to implement a computing device capable of executing any of the software components presented herein. For example, and without limitation, the computing architecture described with reference to FIG. 5 can be utilized to implement the computing devices 104, illustrated in FIG. 1A and described above, which are capable of executing the operating system 114, the application 106, the OS API 304, the sync client 314, the activity monitor 330, and/or any of the other software components described above.

The computer 500 illustrated in FIG. 5 includes a central processing unit 502 ("CPU"), a system memory 504, including a random-access memory 506 ("RAM") and a read-only memory ("ROM") 508, and a system bus 510 that couples the memory 504 to the CPU 502. A basic input/output system ("BIOS" or "firmware") containing the basic routines that help to transfer information between elements within the computer 500, such as during startup, is stored in the ROM 508. The computer 500 further includes a mass storage device 512 for storing an operating system 114 and one or more programs including, but not limited to, the application 106. The mass storage device 512 can also be configured to store other types of programs and data such as the activity data structure 116 and the file 108.

The mass storage device 512 is connected to the CPU 502 through a mass storage controller (not shown) connected to the bus 510. The mass storage device 512 and its associated computer readable media provide non-volatile storage for the computer 500. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 500.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 500. For purposes of the claims, the phrase "computer storage medium," and variations thereof, does not include waves or signals per se or communication media.

According to various configurations, the computer 500 can operate in a networked environment using logical connections to remote computers through a network such as the network 518. The computer 500 can connect to the network 518 through a network interface unit 520 connected to the bus 510. It should be appreciated that the network interface unit 520 can also be utilized to connect to other types of networks and remote computer systems. The computer 500 can also include an input/output controller 516 for receiving and processing input from a number of other devices, including a keyboard, mouse, touch input, or electronic stylus (not shown in FIG. 5). Similarly, the input/output controller 516 can provide output to a display screen or other type of output device (also not shown in FIG. 5).

It should be appreciated that the software components described herein, such as the operating system 114, the application 106, the OS API 304, the sync client 314, and the activity monitor 330, when loaded into the CPU 502 and executed, can transform the CPU 502 and the overall computer 500 from a general-purpose computing device into a special-purpose computing device customized to facilitate the functionality presented herein. The CPU 502 can be constructed from any number of transistors or other discrete circuit elements, which can individually or collectively assume any number of states. More specifically, the CPU 502 can operate as a finite-state machine, in response to executable instructions contained within the software modules disclosed herein. These computer-executable instructions can transform the CPU 502 by specifying how the CPU 502 transitions between states, thereby transforming the transistors or other discrete hardware elements constituting the CPU 502.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 500 in order to store and execute the software components presented herein. It also should be appreciated that the architecture shown in FIG. 5 for the computer 500, or a similar architecture, can be utilized to implement other types of computing devices, including hand-held computers, embedded computer systems, mobile devices such as smartphones and tablets, and other types of computing devices known to those skilled in the art. It is also contemplated that the computer 500 might not include all of the components shown in FIG. 5, can include other components that are not explicitly shown in FIG. 5, or can utilize an architecture completely different than that shown in FIG. 5.

Figure 6:
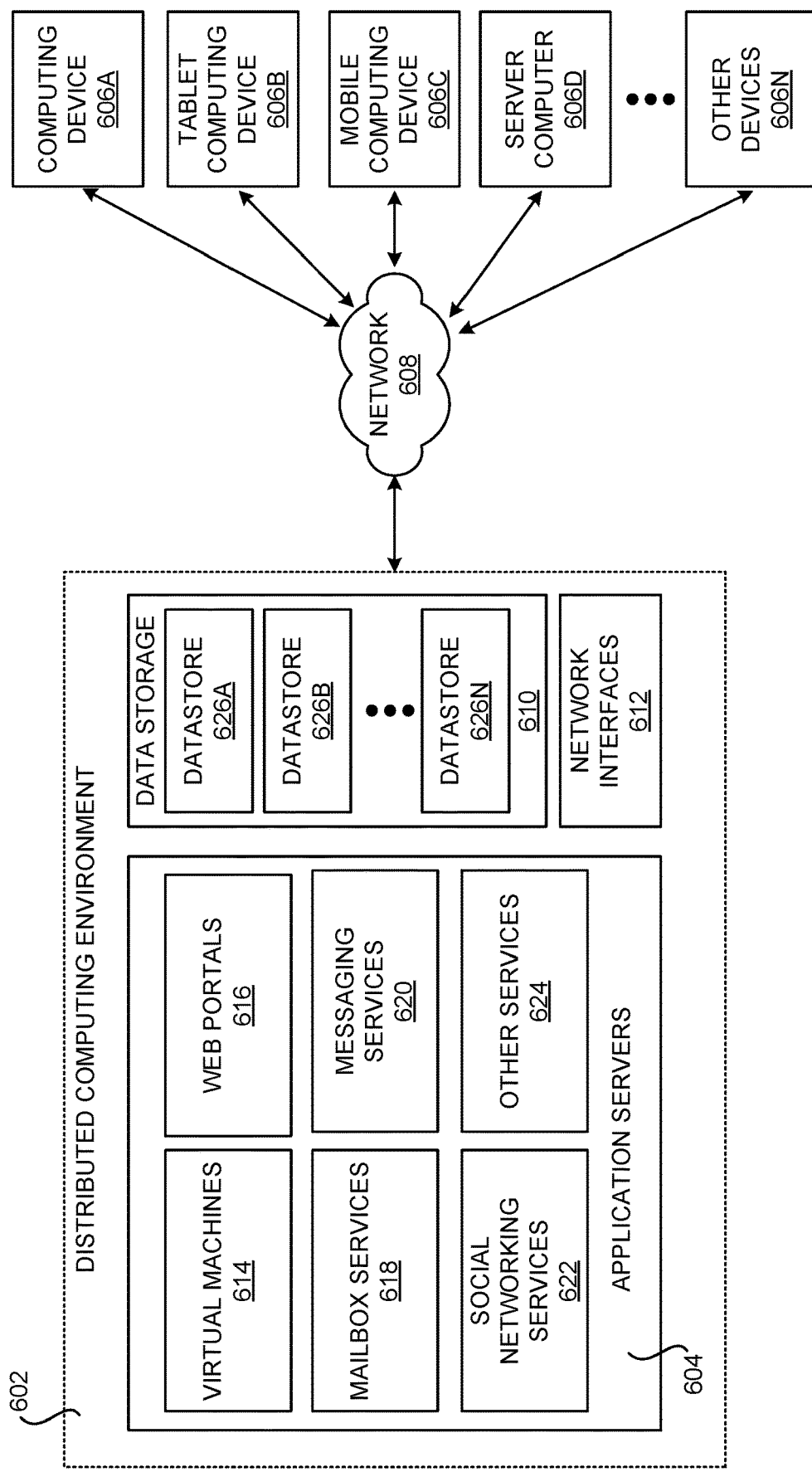
FIG. 6 is a network diagram illustrating a distributed computing environment capable of implementing aspects of the technologies presented herein.

FIG. 6 shows aspects of an illustrative distributed computing environment 602 in which the software components described herein can be executed. Thus, the distributed computing environment 602 illustrated in FIG. 6 can be used to execute program code, such as the operating system 114, the application 106, the OS API 304, the sync client 314, and the activity monitor 330, capable of providing the functionality described above with respect to FIGS. 1A-4B, and/or any of the other software components described herein.

According to various implementations, the distributed computing environment 602 operates on, in communication with, or as part of a network 608. One or more client devices 606A-606N (hereinafter referred to collectively and/or generically as "devices 606") can communicate with the distributed computing environment 602 via the network 608 and/or other connections (not illustrated in FIG. 6).

In the illustrated configuration, the devices 606 include: a computing device 606A such as a laptop computer, a desktop computer, or other computing device; a "slate" or tablet computing device ("tablet computing device") 606B; a mobile computing device 606C such as a mobile telephone, a smartphone, or other mobile computing device; a server computer 606D; and/or other devices 606N. It should be understood that any number of devices 606 can communicate with the distributed computing environment 602. Two example computing architectures for the devices 606 are illustrated and described herein with reference to FIGS. 5 and 7. It should be understood that the illustrated clients 606 and computing architectures illustrated and described herein are illustrative and should not be construed as being limited in any way.

In the illustrated configuration, the distributed computing environment 602 includes application servers 604, data storage 610, and one or more network interfaces 612. According to various implementations, the functionality of the application servers 604 can be provided by one or more server computers that are executing as part of, or in communication with, the network 608. The application servers 604 can host various services such as virtual machines, portals, and/or other resources. In the illustrated configuration, the application servers 604 host one or more virtual machines 614 for hosting applications, such as program components for implementing the operating system 114, the application 106, the OS API 304, the sync client 314, the activity monitor 330, or other functionality. It should be understood that this configuration is illustrative and should not be construed as being limiting in any way. The application servers 604 might also host or provide access to one or more web portals, link pages, websites, and/or other information ("web portals") 616.

According to various implementations, the application servers 604 also include one or more mailbox services 618 and one or more messaging services 620. The mailbox services 618 can include electronic mail ("email") services. The mailbox services 618 can also include various personal information management ("PIM") services including, but not limited to, calendar services, contact management services, collaboration services, and/or other services. The messaging services 620 can include, but are not limited to, instant messaging ("IM") services, chat services, forum services, and/or other communication services.

The application servers 604 can also include one or more social networking services 622. The social networking services 622 can provide various types of social networking services including, but not limited to, services for sharing or posting status updates, instant messages, links, photos, videos, and/or other information, services for commenting or displaying interest in articles, products, blogs, or other resources, and/or other services. In some configurations, the social networking services 622 are provided by or include the FACEBOOK social networking service, the LINKEDIN professional networking service, the FOURSQUARE geographic networking service, and the like. In other configurations, the social networking services 622 are provided by other services, sites, and/or providers that might be referred to as "social networking providers." For example, some websites allow users to interact with one another via email, chat services, and/or other means during various activities and/or contexts such as reading published articles, commenting on goods or services, publishing, collaboration, gaming, and the like. Other services are possible and are contemplated.

The social network services 622 can include commenting, blogging, and/or microblogging services. Examples of such services include, but are not limited to, the YELP commenting service, the KUDZU review service, the OFFICETALK enterprise microblogging service, the TWITTER messaging service, and/or other services. It should be appreciated that the above lists of services are not exhaustive and that numerous additional and/or alternative social networking services 622 are not mentioned herein for the sake of brevity. As such, the configurations described above are illustrative, and should not be construed as being limited in any way.

As also shown in FIG. 6, the application servers 604 can also host other services, applications, portals, and/or other resources ("other services") 624. These services can include, but are not limited to, streaming video services like the NETFLIX streaming video service and productivity services such as the GMAIL email service from GOOGLE INC. It thus can be appreciated that activities performed by users of the distributed computing environment 602 can include various mailbox, messaging, social networking, group conversation, productivity, entertainment, and other types of activities. Use of these services, and others, can be detected and used to customize the operation of a computing device utilizing the technologies disclosed herein.

As mentioned above, the distributed computing environment 602 can include data storage 610. According to various implementations, the functionality of the data storage 610 is provided by one or more databases operating on, or in communication with, the network 608. The functionality of the data storage 610 can also be provided by one or more server computers configured to host data for the distributed computing environment 602. The data storage 610 can include, host, or provide one or more real or virtual datastores 626A-626N (hereinafter referred to collectively and/or generically as "datastores 626"). The datastores 626 are configured to host data used or created by the application servers 604 and/or other data.

The distributed computing environment 602 can communicate with, or be accessed by, the network interfaces 612. The network interfaces 612 can include various types of network hardware and software for supporting communications between two or more computing devices including, but not limited to, the devices 606 and the application servers 604. It should be appreciated that the network interfaces 612 can also be utilized to connect to other types of networks and/or computer systems.

It should be understood that the distributed computing environment 602 described herein can implement any aspects of the software elements described herein with any number of virtual computing resources and/or other distributed computing functionality that can be configured to execute any aspects of the software components disclosed herein. It should also be understood that the devices 606 can also include real or virtual machines including, but not limited to, server computers, web servers, personal computers, mobile computing devices, smartphones, and/or other devices. As such, various implementations of the technologies disclosed herein enable any device configured to access the distributed computing environment 602 to utilize the functionality described herein.

Figure 7:
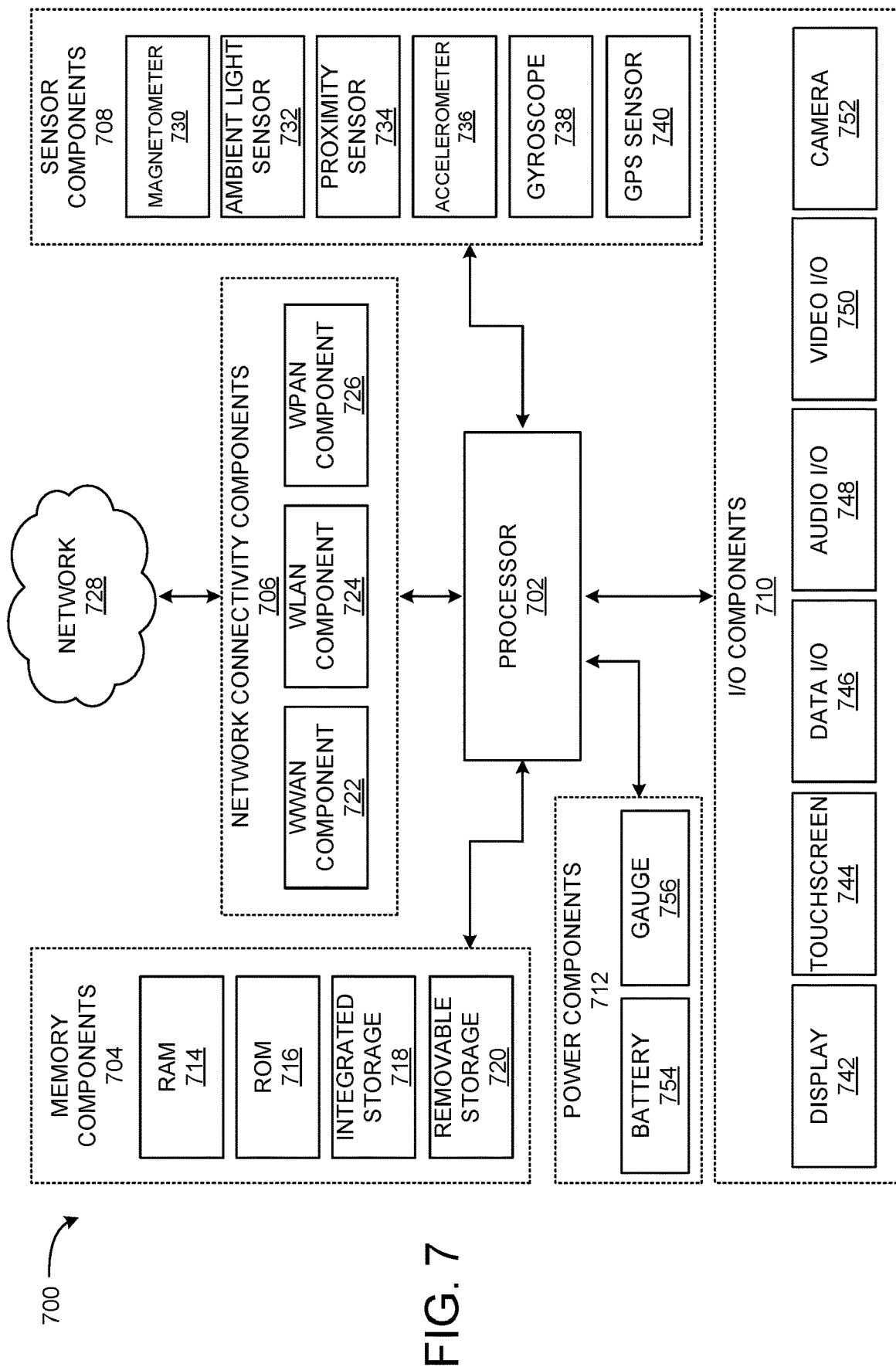
FIG. 7 is a computer architecture diagram illustrating a computing device architecture for a computing device, such as the computing devices shown in FIG. 1A, that is capable of implementing aspects of the technologies presented herein.

Turning now to FIG. 7, an illustrative computing device architecture 700 will be described for a computing device, such as the computing devices 104, that is capable of executing the various software components described herein. The computing device architecture 700 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like.

The computing device architecture 700 is also applicable to any of the devices 606 shown in FIG. 6. Furthermore, aspects of the computing device architecture 700 are applicable to traditional desktop computers, portable computers (e.g., laptops, notebooks, ultra-portables, and netbooks), server computers, and other computer devices, such as those described herein. For example, the single touch and multi-touch aspects disclosed herein below can be applied to desktop, laptop, convertible, or tablet computer devices that utilize a touchscreen or some other touch-enabled device, such as a touch-enabled track pad or touch-enabled mouse. The computing device architecture 700 can also be utilized to implement the computing devices 104, and/or other types of computing devices for implementing or consuming the functionality described herein.

The computing device architecture 700 illustrated in FIG. 7 includes a processor 702, memory components 704, network connectivity components 707, sensor components 708, input/output components 710, and power components 712. In the illustrated configuration, the processor 702 is in communication with the memory components 704, the network connectivity components 706, the sensor components 708, the input/output ("I/O") components 710, and the power components 712. Although no connections are shown between the individual components illustrated in FIG. 7, the components can be connected electrically in order to interact and carry out device functions. In some configurations, the components are arranged so as to communicate via one or more busses (not shown).

The processor 702 includes one or more CPU cores configured to process data, execute computer-executable instructions of one or more application programs and to communicate with other components of the computing device architecture 700 in order to perform various functionality described herein. The processor 702 can be utilized to execute aspects of the software components presented herein and, particularly, those that utilize, at least in part, a touch-enabled input.

In some configurations, the processor 702 includes a graphics processing unit ("GPU") configured to accelerate operations performed by the CPU, including, but not limited to, operations performed by executing general-purpose scientific and engineering computing applications, as well as graphics-intensive computing applications such as high-resolution video (e.g., 720P, 1080P, 4K, and greater), video games, 3D modeling applications, and the like. In some configurations, the processor 702 is configured to communicate with a discrete GPU (not shown). In any case, the CPU and GPU can be configured in accordance with a co-processing CPU/GPU computing model, wherein the sequential part of an application executes on the CPU and the computationally intensive part is accelerated by the GPU.

In some configurations, the processor 702 is, or is included in, a system-on-chip ("SoC") along with one or more of the other components described herein below. For example, the SoC can include the processor 702, a GPU, one or more of the network connectivity components 706, and one or more of the sensor components 708. In some configurations, the processor 702 is fabricated, in part, utilizing a package-on-package ("PoP") integrated circuit packaging technique. Moreover, the processor 702 can be a single core or multi-core processor.

The processor 702 can be created in accordance with an ARM architecture, available for license from ARM HOLDINGS of Cambridge, United Kingdom. Alternatively, the processor 702 can be created in accordance with an x86 architecture, such as is available from INTEL CORPORATION of Mountain View, Calif. and others. In some configurations, the processor 702 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 704 include a RAM 714, a ROM 716, an integrated storage memory ("integrated storage") 718, and a removable storage memory ("removable storage") 720. In some configurations, the RAM 714 or a portion thereof, the ROM 716 or a portion thereof, and/or some combination of the RAM 714 and the ROM 716 is integrated in the processor 702. In some configurations, the ROM 716 is configured to store a firmware, an operating system or a portion thereof (e.g., operating system kernel), and/or a bootloader to load an operating system kernel from the integrated storage 718 or the removable storage 720.

The integrated storage 718 can include a solid-state memory, a hard disk, or a combination of solid-state memory and a hard disk. The integrated storage 718 can be soldered or otherwise connected to a logic board upon which the processor 702 and other components described herein might also be connected. As such, the integrated storage 718 is integrated in the computing device. The integrated storage 718 can be configured to store an operating system or portions thereof, application programs, data, and other software components described herein.

The removable storage 720 can include a solid-state memory, a hard disk, or a combination of solid-state memory and a hard disk. In some configurations, the removable storage 720 is provided in lieu of the integrated storage 718. In other configurations, the removable storage 720 is provided as additional optional storage. In some configurations, the removable storage 720 is logically combined with the integrated storage 718 such that the total available storage is made available and shown to a user as a total combined capacity of the integrated storage 718 and the removable storage 720.

The removable storage 720 is configured to be inserted into a removable storage memory slot (not shown) or other mechanism by which the removable storage 720 is inserted and secured to facilitate a connection over which the removable storage 720 can communicate with other components of the computing device, such as the processor 702. The removable storage 720 can be embodied in various memory card formats including, but not limited to, PC card, COMPACTFLASH card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 704 can store an operating system. According to various configurations, the operating system includes, but is not limited to, the WINDOWS operating system from MICROSOFT CORPORATION, the IOS operating system from APPLE INC. of Cupertino, Calif., and ANDROID operating system from GOOGLE INC. of Mountain View, Calif. Other operating systems can also be utilized.

The network connectivity components 706 include a wireless wide area network component ("WWAN component") 722, a wireless local area network component ("WLAN component") 724, and a wireless personal area network component ("WPAN component") 726. The network connectivity components 706 facilitate communications to and from a network 728, which can be a WWAN, a WLAN, or a WPAN. Although a single network 728 is illustrated, the network connectivity components 706 can facilitate simultaneous communication with multiple networks. For example, the network connectivity components 706 can facilitate simultaneous communications with multiple networks via one or more of a WWAN, a WLAN, or a WPAN.

The network 728 can be a WWAN, such as a mobile telecommunications network utilizing one or more mobile telecommunications technologies to provide voice and/or data services to a computing device utilizing the computing device architecture 700 via the WWAN component 722. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX").

Moreover, the network 728 can utilize various channel access methods (which might or might not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications can be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 728 can be configured to provide voice and/or data communications with any combination of the above technologies. The network 728 can be configured or adapted to provide voice and/or data communications in accordance with future generation technologies.

In some configurations, the WWAN component 722 is configured to provide dual-multi-mode connectivity to the network 728. For example, the WWAN component 722 can be configured to provide connectivity to the network 728, wherein the network 728 provides service via GSM and UMTS technologies, or via some other combination of technologies. Alternatively, multiple WWAN components 722 can be utilized to perform such functionality, and/or provide additional functionality to support other non-compatible technologies (i.e., incapable of being supported by a single WWAN component). The WWAN component 722 can facilitate similar connectivity to multiple networks (e.g., a UMTS network and an LTE network).

The network 728 can be a WLAN operating in accordance with one or more Institute of Electrical and Electronic Engineers ("IEEE") 104.11 standards, such as IEEE 104.11a, 104.11b, 104.11g, 104.11n, and/or a future 104.11 standard (referred to herein collectively as WI-FI). Draft 104.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 724 is configured to connect to the network 728 via the WI-FI access points. Such connections can be secured via various encryption technologies including, but not limited, WI-FI Protected Access ("WPA"), WPA2, Wired Equivalent Privacy ("WEP"), and the like.

The network 728 can be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 726 is configured to facilitate communications with other devices, such as peripherals, computers, or other computing devices via the WPAN.

The sensor components 708 include a magnetometer 730, an ambient light sensor 732, a proximity sensor 734, an accelerometer 736, a gyroscope 738, and a Global Positioning System sensor ("GPS sensor") 740. It is contemplated that other sensors, such as, but not limited to, temperature sensors or shock detection sensors, might also be incorporated in the computing device architecture 700.

The magnetometer 730 is configured to measure the strength and direction of a magnetic field. In some configurations, the magnetometer 730 provides measurements to a compass application program stored within one of the memory components 704 in order to provide a user with accurate directions in a frame of reference including the cardinal directions, north, south, east, and west. Similar measurements can be provided to a navigation application program that includes a compass component. Other uses of measurements obtained by the magnetometer 730 are contemplated.

The ambient light sensor 732 is configured to measure ambient light. In some configurations, the ambient light sensor 732 provides measurements to an application program stored within one the memory components 704 in order to automatically adjust the brightness of a display (described below) to compensate for low light and bright light environments. Other uses of measurements obtained by the ambient light sensor 732 are contemplated.

The proximity sensor 734 is configured to detect the presence of an object or thing in proximity to the computing device without direct contact. In some configurations, the proximity sensor 734 detects the presence of a user's body (e.g., the user's face) and provides this information to an application program stored within one of the memory components 704 that utilizes the proximity information to enable or disable some functionality of the computing device. For example, a telephone application program can automatically disable a touchscreen (described below) in response to receiving the proximity information so that the user's face does not inadvertently end a call or enable/disable other functionality within the telephone application program during the call. Other uses of proximity as detected by the proximity sensor 734 are contemplated.

The accelerometer 736 is configured to measure acceleration. In some configurations, output from the accelerometer 736 is used by an application program as an input mechanism to control some functionality of the application program. In some configurations, output from the accelerometer 736 is provided to an application program for use in switching between landscape and portrait modes, calculating coordinate acceleration, or detecting a fall. Other uses of the accelerometer 736 are contemplated.

The gyroscope 738 is configured to measure and maintain orientation. In some configurations, output from the gyroscope 738 is used by an application program as an input mechanism to control some functionality of the application program. For example, the gyroscope 738 can be used for accurate recognition of movement within a 3D environment of a video game application or some other application. In some configurations, an application program utilizes output from the gyroscope 738 and the accelerometer 736 to enhance user input operations. Other uses of the gyroscope 738 are contemplated.

The GPS sensor 740 is configured to receive signals from GPS satellites for use in calculating a location. The location calculated by the GPS sensor 740 can be used by any application program that requires or benefits from location information. For example, the location calculated by the GPS sensor 740 can be used with a navigation application program to provide directions from the location to a destination or directions from the destination to the location. Moreover, the GPS sensor 740 can be used to provide location information to an external location-based service, such as E911 service. The GPS sensor 740 can obtain location information generated via WI-FI, WIMAX, and/or cellular triangulation techniques utilizing one or more of the network connectivity components 706 to aid the GPS sensor 740 in obtaining a location fix. The GPS sensor 740 can also be used in Assisted GPS ("A-GPS") systems.

The I/O components 710 include a display 742, a touchscreen 744, a data I/O interface component ("data I/O") 746, an audio I/O interface component ("audio I/O") 748, a video I/O interface component ("video I/O") 750, and a camera 752. In some configurations, the display 742 and the touchscreen 744 are combined. In some configurations two or more of the data I/O component 746, the audio I/O component 748, and the video I/O component 750 are combined. The I/O components 710 can include discrete processors configured to support the various interfaces described below or might include processing functionality built-in to the processor 702.

The display 742 is an output device configured to present information in a visual form. In particular, the display 742 can present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 742 is a liquid crystal display ("LCD") utilizing any active or passive matrix technology and any backlighting technology (if used). In some configurations, the display 742 is an organic light emitting diode ("OLED") display. Other display types are contemplated.

The touchscreen 744 is an input device configured to detect the presence and location of a touch. The touchscreen 744 can be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or can utilize any other touchscreen technology. In some configurations, the touchscreen 744 is incorporated on top of the display 742 as a transparent layer to enable a user to use one or more touches to interact with objects or other information presented on the display 742. In other configurations, the touchscreen 744 is a touch pad incorporated on a surface of the computing device that does not include the display 742. For example, the computing device can have a touchscreen incorporated on top of the display 742 and a touch pad on a surface opposite the display 742.

In some configurations, the touchscreen 744 is a single-touch touchscreen. In other configurations, the touchscreen 744 is a multi-touch touchscreen. In some configurations, the touchscreen 744 is configured to detect discrete touches, single touch gestures, and/or multi-touch gestures. These are collectively referred to herein as "gestures" for convenience. Several gestures will now be described. It should be understood that these gestures are illustrative and are not intended to limit the scope of the appended claims. Moreover, the described gestures, additional gestures, and/or alternative gestures can be implemented in software for use with the touchscreen 744. As such, a developer can create gestures that are specific to a particular application program.

In some configurations, the touchscreen 744 supports a tap gesture in which a user taps the touchscreen 744 once on an item presented on the display 742. The tap gesture can be used for various reasons including, but not limited to, opening or launching whatever the user taps, such as a graphical icon. In some configurations, the touchscreen 744 supports a double tap gesture in which a user taps the touchscreen 744 twice on an item presented on the display 742. The double tap gesture can be used for various reasons including, but not limited to, zooming in or zooming out in stages. In some configurations, the touchscreen 744 supports a tap and hold gesture in which a user taps the touchscreen 744 and maintains contact for at least a pre-defined time. The tap and hold gesture can be used for various reasons including, but not limited to, opening a context-specific menu.

In some configurations, the touchscreen 744 supports a pan gesture in which a user places a finger on the touchscreen 744 and maintains contact with the touchscreen 744 while moving the finger on the touchscreen 744. The pan gesture can be used for various reasons including, but not limited to, moving through screens, images, or menus at a controlled rate. Multiple finger pan gestures are also contemplated. In some configurations, the touchscreen 744 supports a flick gesture in which a user swipes a finger in the direction the user wants the screen to move. The flick gesture can be used for various reasons including, but not limited to, scrolling horizontally or vertically through menus or pages. In some configurations, the touchscreen 744 supports a pinch and stretch gesture in which a user makes a pinching motion with two fingers (e.g., thumb and forefinger) on the touchscreen 744 or moves the two fingers apart. The pinch and stretch gesture can be used for various reasons including, but not limited to, zooming gradually in or out of a website, map, or picture.

Although the gestures described above have been presented with reference to the use of one or more fingers for performing the gestures, other appendages such as toes or objects such as styluses can be used to interact with the touchscreen 744. As such, the above gestures should be understood as being illustrative and should not be construed as being limiting in any way.

The data I/O interface component 746 is configured to facilitate input of data to the computing device and output of data from the computing device. In some configurations, the data I/O interface component 746 includes a connector configured to provide wired connectivity between the computing device and a computer system, for example, for synchronization operation purposes. The connector can be a proprietary connector or a standardized connector such as USB, micro-USB, mini-USB, USB-C, or the like. In some configurations, the connector is a dock connector for docking the computing device with another device such as a docking station, audio device (e.g., a digital music player), or video device.

The audio I/O interface component 748 is configured to provide audio input and/or output capabilities to the computing device. In some configurations, the audio I/O interface component 748 includes a microphone configured to collect audio signals. In some configurations, the audio I/O interface component 748 includes a headphone jack configured to provide connectivity for headphones or other external speakers. In some configurations, the audio interface component 748 includes a speaker for the output of audio signals. In some configurations, the audio I/O interface component 748 includes an optical audio cable out.

The video I/O interface component 750 is configured to provide video input and/or output capabilities to the computing device. In some configurations, the video I/O interface component 750 includes a video connector configured to receive video as input from another device (e.g., a video media player such as a DVD or BLU-RAY player) or send video as output to another device (e.g., a monitor, a television, or some other external display). In some configurations, the video I/O interface component 750 includes a High-Definition Multimedia Interface ("HDMI"), mini-HDMI, micro-HDMI, DisplayPort, or proprietary connector to input/output video content. In some configurations, the video I/O interface component 750 or portions thereof is combined with the audio I/O interface component 748 or portions thereof.

The camera 752 can be configured to capture still images and/or video. The camera 752 can utilize a charge coupled device ("CCD") or a complementary metal oxide semiconductor ("CMOS") image sensor to capture images. In some configurations, the camera 752 includes a flash to aid in taking pictures in low-light environments. Settings for the camera 752 can be implemented as hardware or software buttons.

Although not illustrated, one or more hardware buttons can also be included in the computing device architecture 700. The hardware buttons can be used for controlling some operational aspect of the computing device. The hardware buttons can be dedicated buttons or multi-use buttons. The hardware buttons can be mechanical or sensor-based.

The illustrated power components 712 include one or more batteries 754, which can be connected to a battery gauge 756. The batteries 754 can be rechargeable or disposable. Rechargeable battery types include, but are not limited to, lithium polymer, lithium ion, nickel cadmium, and nickel metal hydride. Each of the batteries 754 can be made of one or more cells.

The battery gauge 756 can be configured to measure battery parameters such as current, voltage, and temperature. In some configurations, the battery gauge 756 is configured to measure the effect of a battery's discharge rate, temperature, age and other factors to predict remaining life within a certain percentage of error. In some configurations, the battery gauge 756 provides measurements to an application program that is configured to utilize the measurements to present useful power management data to a user. Power management data can include one or more of a percentage of battery used, a percentage of battery remaining, a battery condition, a remaining time, a remaining capacity (e.g., in watt hours), a current draw, and a voltage.

The power components 712 can also include a power connector (not shown), which can be combined with one or more of the aforementioned I/O components 710. The power components 712 can interface with an external power system or charging equipment via a power I/O component 710. Other configurations can also be utilized.

The disclosure presented herein also encompasses the subject matter set forth in the following clauses:

Clause 1. A computer-implemented method, comprising: receiving a request for a location of a file, the request comprising a file protocol URI for the file having a query string comprising an object identifier (ID) property comprising a unique ID for the file, a volume ID property comprising a unique ID for a first storage volume storing the file, or a known folder property indicating if the file is stored in a known folder; responsive to receiving the request, determining whether the file is stored at the path to the file specified by the file protocol URI; responsive to determining that the file is not stored at the path to the file specified by the file protocol URI, determining the location of the file using the object ID property, the volume ID property, or the known folder property; and providing data identifying the location of the file responsive to the request.

Clause 2. The computer-implemented method of clause 1, wherein the query string further comprises one or more other properties of the file, one or more properties associated with the file by a file system, or secondary metadata.

Clause 3. The computer-implemented method of any of clauses 1-2, wherein determining the location of the file using the object ID property comprises searching a second storage volume for the file.

Clause 4. The computer-implemented method of any of clauses 1-3, wherein determining the location of the file using the volume ID property comprises: determining whether a second storage volume having a different path than the first storage volume is available that has an associated unique ID matching the unique ID for the first storage volume; and responsive to determining the unique ID for the first storage volume and the unique ID for the second storage volume match, searching the second storage volume for the file.

Clause 5. The computer-implemented method of any of clauses 1-4, wherein determining the location of the file using the known folder property comprises searching one or more known folders for the file.

Clause 6. The computer-implemented method of any of clauses 1-5, wherein the file protocol is associated with an activation URI, the activation URI comprising a URI for activating an application associated with the file.

Clause 7. The computer-implemented method of any of clauses 1-6, wherein the file is accessed by: activating the application associated with the file using the activation URI; and accessing the file, by way of the application, at the identified location of the file.

Clause 8. A computing device, comprising: one or more processors; and at least one computer storage medium having computer executable instructions stored thereon which, when executed by the one or more processors, cause the computing device to receive a request for a content universal resource identifier (URI) for a file, the request specifying a path to the file on a storage volume; and responsive to receiving the request, locate an object identifier (ID) property for the file, the object ID property comprising a unique ID corresponding to the file, locate a volume ID property comprising a unique ID for the storage volume, determine if the file is stored in a known folder, create the content URI for the file, the content URI comprising a file protocol URI for the file having a query string comprising the object ID property, the volume ID property, or a known folder property identifying the known folder if the file is stored in the known folder, and return the content URI in response to the request, whereby the content URI can be used to locate the file.

Clause 9. The computing device of clause 8, wherein the query string further comprises one or more other properties of the file, one or more properties associated with the file by a file system, or secondary metadata.

Clause 10. The computing device of any of clauses 8-9, wherein the request for the content URI is received from an application configured to store the content URI in an activity data structure with an activation URI, the activation URI comprising a URI for activating the application.

Clause 11. The computing device of any of clauses 8-10, wherein the request for the content URI is received from an activity monitor configured to monitor an application, and wherein the activity monitor is configured to store the content URI in an activity data structure with an activation URI, the activation URI comprising a URI for activating the application.

Clause 12. The computing device of any of clauses 8-11, wherein the request for the content URI is received at an application programming interface (API).

Clause 13. The computing device of any of clauses 8-12, wherein the content URI is encompassed in an activity data structure, the activity data structure comprising an activation URI identifying an application, wherein the activation URI is utilized to activate the application, and wherein the content URI is utilized to locate the file.

Clause 14. At least one computer storage medium having computer executable instructions stored thereon which, when executed by one or more processors of a computing device, cause the computing device to: determine whether a file is located at a path specified by a file protocol URI; responsive to determining that the file is not located at the path specified by the file protocol URI, obtain one or more parameters from a query string of the file protocol URI, and determine a location of the file using the parameters from the query string of the file protocol URI; and cause an access of the file to be made at the determined location of the file.

Clause 15. The at least one computer storage medium of clause 14, wherein at least one of the parameters from the query string of the file protocol URI comprises a unique identifier (ID) for the file.

Clause 16. The at least one computer storage medium of any of clauses 14-15, wherein determining a location of the file using the parameters from the query string of the file protocol URI comprises performing a search for the file based upon the unique ID for the file.

Clause 17. The at least one computer storage medium of any of clauses 14-16, wherein at least one of the parameters from the query string of the file protocol URI comprises a unique identifier for a first storage volume storing the file.

Clause 18. The at least one computer storage medium of any of clauses 14-17, wherein determining a location of the file using the parameters from the query string of the file protocol URI comprises searching a second storage volume for the file, the second storage volume having the same unique identifier as the first storage volume.

Clause 19. The at least one computer storage medium of any of clauses 14-18, wherein at least one of the parameters from the query string of the file protocol URI comprises a known folder property for the file specifying a known folder on a first computing device in which the file is stored.

Clause 20. The at least one computer storage medium of any of clauses 14-19, wherein determining a location of the file using the parameters from the query string of the file protocol URI comprises searching the known folder for the file on a second computing device.

Based on the foregoing, it should be appreciated that various technologies for locating files using a durable and universal file identifier have been disclosed herein. Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:

1. A computer-implemented method for determining a location of a moved file in a computing environment, comprising:
   receiving a file protocol uniform resource identifier (URI) for the moved file, the file protocol URI comprising:
   a last known path to the moved file; and
   information usable to locate the moved file in lieu of the last known path, the information comprising one or more of:
   an object identifier (ID) property comprising a unique ID for the moved file, a volume ID property comprising a unique ID for a first storage volume storing the moved file, or a known folder property indicating if the moved file is stored in a folder known to an operating system of the computing environment;
   wherein the file protocol URI is associated with an activation URI comprising a URI for activating an application associated with the moved file;
   determining whether the moved file is stored at the last known path to the file specified by the file protocol URI;
   responsive to determining that the moved file is not stored at the last known path specified by the file protocol URI, determining a current location of the moved file using the object ID property, the volume ID property, or the known folder property, in lieu of the last known path;
   activating the application associated with the moved file using the activation URI; and
   accessing the moved file, by way of the application, at the location of the moved file.

2. The computer-implemented method of claim 1, wherein the information further comprises one or more other properties of the moved file, one or more properties associated with the moved file by a file system, or secondary metadata.

3. The computer-implemented method of claim 1, wherein determining the current location of the moved file using the object ID property comprises searching a second storage volume for the moved file.

4. The computer-implemented method of claim 1, wherein determining the current location of the moved file using the volume ID property comprises:
   determining whether a second storage volume having a different path than the first storage volume is available that has an associated unique ID matching the unique ID for the first storage volume; and
   responsive to determining the unique ID for the first storage volume and the unique ID for the second storage volume match, searching the second storage volume for the moved file.

5. The computer-implemented method of claim 1, wherein determining the current location of the moved file using the known folder property comprises searching one or more known folders for the moved file.

6. A computing device, comprising:
   one or more processors; and
   at least one computer storage medium having computer executable instructions stored thereon which, when executed by the one or more processors, cause the computing device to:
   receive a request for a content universal resource identifier (URI) for a renamed file, the request specifying a last known path to the renamed file on a storage volume; and
   responsive to receiving the request,
   locate an object identifier (ID) property for the renamed file, the object ID property comprising a unique ID corresponding to the renamed file,
   locate a volume ID property comprising a unique ID for the storage volume,
   determine that the renamed file is stored in a known folder,
   create the content URI for the renamed file, the content URI comprising a file protocol URI for the renamed file having a query string comprising the object ID property, the volume ID property, or a known folder property identifying the known folder when the renamed file is stored in the known folder,
   wherein the file protocol URI is associated with an activation URI comprising a URI for activating an application associated with the renamed file; and
   return the content URI in response to the request, whereby the content URI is usable to locate the renamed file in place of using the last known path, when the file is renamed; and wherein the activation URI is usable to:
   activate the application associated with the renamed file using the activation URI; and
   access the renamed file, by way of the application, at the location of the renamed file.

7. The computing device of claim 6, wherein the query string further comprises one or more other properties of the renamed file, one or more properties associated with the renamed file by a file system, or secondary metadata.

8. The computing device of claim 6, wherein the content URI is stored in an activity data structure with the activation URI.

9. The computing device of claim 6, wherein the request for the content URI is received from an activity monitor, and wherein the content URI is stored in an activity data structure with the activation URI.

10. The computing device of claim 6, wherein the request for the content URI is received at an application programming interface (API).

11. The computing device of claim 6, wherein the content URI is encompassed in an activity data structure, the activity data structure comprising the activation URI.

12. At least one computer storage medium having computer executable instructions stored thereon which, when executed by one or more processors of a computing device, cause the computing device to:
   determine whether a moved or renamed file is located at a last known path specified by a file protocol URI;
   wherein the file protocol URI is associated with an activation URI comprising a URI for activating an application associated with the moved or renamed file;
   responsive to determining that the moved or renamed file is not located at the last known path specified by the file protocol URI,
   obtain one or more parameters from a query string of the file protocol URI, the one or more parameters usable to locate the moved or renamed file in lieu of the last known path specified by the file protocol URI, and
   determine a location of the moved or renamed file using the parameters from the query string of the file protocol URI;
   cause an activation of the application associated with the moved or renamed file using the activation URI; and cause an access of the moved or renamed file to be made, by way of the application, at the determined location of the moved or renamed file.

13. The at least one computer storage medium of claim 12, wherein at least one of the parameters from the query string of the file protocol URI comprises a unique identifier (ID) for the moved or renamed file.

14. The at least one computer storage medium of claim 13, wherein determining a location of the moved or renamed file using the parameters from the query string of the file protocol URI comprises performing a search for the moved or renamed file based upon the unique ID for the moved or renamed file.

15. The at least one computer storage medium of claim 12, wherein at least one of the parameters from the query string of the file protocol URI comprises a unique identifier for a first storage volume storing the moved or renamed file.

16. The at least one computer storage medium of claim 15, wherein determining a location of the moved or renamed file using the parameters from the query string of the file protocol URI comprises searching a second storage volume for the moved or renamed file, the second storage volume having the same unique identifier as the first storage volume.

17. The at least one computer storage medium of claim 12, wherein at least one of the parameters from the query string of the file protocol URI comprises a known folder property for the moved or renamed file specifying a known folder on a first computing device in which the moved or renamed file is stored.

18. The at least one computer storage medium of claim 17, wherein determining a location of the moved or renamed file using the parameters from the query string of the file protocol URI comprises searching the known folder for the moved or renamed file on a second computing device.

* * * * *